United States Patent
Yu et al.

(10) Patent No.: US 11,259,382 B2
(45) Date of Patent: Feb. 22, 2022

(54) BLEEDER CONTROL CIRCUIT, DRIVER SYSTEM, AND METHOD FOR CONTROLLING BLEEDER

(71) Applicant: Shanghai Bright Power Semiconductor Co., Ltd., Shanghai (CN)

(72) Inventors: Wei-Jia Yu, Shanghai (CN); Min-Min Fan, Shanghai (CN); Feng Qi, Shanghai (CN)

(73) Assignee: Shanghai Bright Power Semiconductor Co., Ltd., Shanghai (CN)

( * ) Notice: Subject to any disclaimer, the term of this patent is extended or adjusted under 35 U.S.C. 154(b) by 0 days.

(21) Appl. No.: 17/085,863

(22) Filed: Oct. 30, 2020

(65) Prior Publication Data

US 2021/0068228 A1    Mar. 4, 2021

Related U.S. Application Data

(63) Continuation of application No. PCT/CN2018/121806, filed on Dec. 18, 2018.

(30) Foreign Application Priority Data

May 1, 2018   (CN) .......................... 201810406690.9

(51) Int. Cl.
*H05B 45/3575*   (2020.01)
*H05B 45/10*     (2020.01)
*H05B 41/38*     (2006.01)

(52) U.S. Cl.
CPC ......... *H05B 45/3575* (2020.01); *H05B 41/38* (2013.01); *H05B 45/10* (2020.01)

(58) Field of Classification Search
None
See application file for complete search history.

(56) References Cited

U.S. PATENT DOCUMENTS

| | | | | |
|---|---|---|---|---|
| 2015/0366018 A1* | 12/2015 | Kuang | ................... | H05B 45/14 315/206 |
| 2019/0150240 A1* | 5/2019 | Yu | .......................... | H05B 45/31 315/200 R |
| 2019/0208597 A1* | 7/2019 | Wang | ................... | H05B 45/395 |

FOREIGN PATENT DOCUMENTS

| CN | 102333404 A | 1/2012 |
|---|---|---|
| CN | 103841725 B | 1/2016 |
| CN | 105246218 A | 1/2016 |

(Continued)

*Primary Examiner* — Jany Richardson
(74) *Attorney, Agent, or Firm* — Muncy, Geissler, Olds & Lowe, P.C.

(57) ABSTRACT

A control circuit and method for a bleeder, a chip, and a driver system. The bleeder control circuit is connected to a dimmer detector used for detecting the presence or absence of a dimmer and a type of the dimmer. The control circuit of the bleeder is used to receive a detection signal outputted by the dimmer detector, and generate a control signal for the bleeder according to the detection signal, the control signal is used to control an operating state of the bleeder. The application correspondingly generates a control signal for a bleeder according to a detection signal indicating the presence or absence of a dimmer and the type of the dimmer so as to control the bleeder to operate only at a given phase interval, and may thereby reduce the power consumption of the bleeder when ensuring the stable operation of a dimmer.

15 Claims, 19 Drawing Sheets

(56) References Cited

FOREIGN PATENT DOCUMENTS

| | | |
|---|---|---|
| CN | 105517266 A | 4/2016 |
| CN | 107835543 A | 3/2018 |

* cited by examiner

BLEEDER CONTROL CIRCUIT, DRIVER SYSTEM, AND METHOD FOR CONTROLLING BLEEDER

CROSS-REFERENCE TO RELATED APPLICATIONS

This application is a continuation of co-pending International Patent Application No. PCT/CN2018/121806, filed on Dec. 18, 2018, which is incorporated by reference herein in its entirety.

The present application claims the priority to Chinese Patent Application No.: 2018104066909, filed May 1, 2018, the entire contents of which are incorporated herein by reference.

FIELD OF THE INVENTION

The present application relates to the technical field of lighting, particularly to a bleeder control circuit, a driver system, and a method for controlling a bleeder.

BACKGROUND OF THE INVENTION

Light emitting diode (LED) lighting equipment has been widely used in the lighting industry and other fields in which LED is used as an indicator light owing to its advantages of low energy consumption, small size and high durability. In one application of the LED, the brightness of the LED is adjusted through a dimmer. As shown in FIG. 1, which is a structural schematic diagram of an LED driver system applied to a dimmer in the prior art, the LED driver system includes a bleeder 11 and an LED driver 12. Based on the characteristic of the dimmer, it is required to be provided with sufficient load current to maintain the dimmer in a conductive state. Therefore, the bleeder 11 will be coupled to a rectifier bridge in parallel and keeps in a working state to provide additional current when the main power loop current is not sufficient enough to maintain the dimmer being in the conductive state.

However, in actual applications, since the voltage rectified by a rectifier bridge is very high, the bleeder will generate greater power consumption, thereby bringing an unfavorable influence to the reliability of the system.

SUMMARY OF THE INVENTION

In view of the above shortcomings in the prior art, the objective of the present application is to provide a bleeder control circuit, a driver system, and a method for controlling a bleeder, so as to solve the problems of high power consumption and poor system reliability in the bleeder circuit in the prior art.

In one aspect, the present application provides a bleeder control circuit. The bleeder control circuit is coupled to a bleeder and a dimmer detector, wherein the dimmer detector is configured to detect existence and a type of a dimmer to generate a detection signal accordingly, and wherein the bleeder control circuit is configured to receive a detection signal generated by the dimmer detector and to generate a control signal of the bleeder based on the detection signal to control the bleeder.

In some embodiments, the bleeder control circuit comprises a negative peak detector, configured to receive the detection signal and an electric signal indicating a bus voltage, and accordingly generate a timing signal; and a controller, coupled to the negative peak detector and the dimmer detector to receive the timing signal and the detection signal, configured to start timing based on the timing signal, generating a trigger signal when a timing result is equal to a timing reference, and further generating the control signal based on the trigger signal and the detection signal.

In some embodiments, the negative peak detector comprises a first logic circuit, coupled to the dimmer detector and configured to generate an executive signal based on the electric signal and the detection signal; and a pulse generator, coupled to the first logic circuit and configured to output the timing signal based on the executive signal generated by the first logic circuit.

In some embodiments, the controller comprises a timer, coupled to the negative peak detector and configured to receive the timing signal and start timing based on a clock signal; a timing reference generator, coupled to the negative peak detector and the timer, and configured to generate a timing reference; a first comparator, coupled to the timer and the timing reference generator, and configured to generate a reset signal when the timing result is equal to the timing reference; a reset circuit, coupled to the first comparator and the negative peak detector, and configured to generate the trigger signal based on the timing signal and the reset signal; and a first logic gate circuit, coupled to the reset circuit and the dimmer detector, and configured to output the control signal based on the detection signal and the trigger signal.

In some embodiments, the controller comprises a timer, coupled to the negative peak detector and configured to receive the timing signal and to start timing based on a clock signal; a first comparator, coupled to the timer and the timing reference, and configured to generate a reset signal when the timing result is equal to the timing reference; a reset circuit, coupled to the first comparator and the negative peak detector, and configured to generate the trigger signal based on the timing signal and the reset signal; and a first logic gate circuit, coupled to the reset circuit and the detector, and configured to output the control signal based on the detection signal and the trigger signal.

In some embodiments, the timing result is in a form of binary digitals and the timing reference generator comprises a latch, coupled to the timer and configured to latch the timing result generated by the timer; and a register, coupled to the latch and configured to shift bits of the latched timing result to generate the timing reference.

In some embodiments, the timing result is in a form of a voltage level and the timer comprise a first capacitor circuit, configured to record time through charging and discharging of a first capacitor and generate the timing result accordingly.

In some embodiments, the timing reference generator comprises a second capacitor circuit, coupled to the first capacitor circuit and configured to latch the timing result from the first capacitor circuit; and a voltage divider, coupled to the second capacitor circuit and configured to divide the latched timing result to generate the timing reference.

In some embodiments, if the detection signal indicates that the dimmer is a leading edge dimmer, the control circuit generates the control signal to enable the bleeder when a sine angle value of a bus voltage signal is between 0 degree and a first degree, and the control circuit generates the control signal to disable the bleeder when the sine angle value of the bus voltage signal is between the first degree and 180 degrees; and if the detection signal indicates that the dimmer is a trailing-edge dimmer, the control circuit generates the control signal to enable the bleeder when the sine angle value of the bus voltage signal is between 0 degree and a second degree, and the control circuit generates the control signal to disable the bleeder when the sine angle value of the bus voltage signal is between the second degree and 180 degrees; and if the detection signal indicates non-existence of the dimmer, the control circuit generates the control signal to disable the bleeder.

In another aspect, the present application provides a driver system. The driver system comprises a rectifier, configured to rectify an AC input voltage to output a bus voltage to a load; a dimmer detector, configured to receive an electric signal indicating the bus voltage, and to generate a detection signal to detect existence and a type of the dimmer; a bleeder control circuit, coupled to a dimmer detector, the dimmer detector being configured to
detect existence and a type of a dimmer to generate a
detection signal accordingly, and wherein the bleeder control circuit is configured to receive a detection signal generated by the dimmer detector and to generate a control signal based on the detection signal; a bleeder, coupled to the bleeder control circuit, and configured to perform corresponding operating state when the control signal generated by the bleeder control circuit is received.

In another aspect, the present application provides a method for controlling a bleeder. The method comprises the following steps of receiving a detection signal indicating existence and a type of a dimmer; and generating a control signal to control the bleeder based on the detection signal.

In some embodiments, the step of generating the control signal based on the detection signal comprises generating a timing signal; and starting timing based on the timing signal, generating a trigger signal when a timing result is equal to a timing reference, and outputting the control signal based on the trigger signal and the detection signal.

In some embodiments, the step of generating a timing signal comprises outputting an executive signal based on the detection signal and a electric signal indicating a bus voltage; and outputting the timing signal based on the executive signal.

In some embodiments, the step of starting timing is performed through charging and discharging of a capacitor in a first capacitor circuit.

In some embodiments, a timing result is in a form of binary digitals and the timing reference is generated through shifting bits of the timing result.

In some embodiments, a timing result is in a form of voltage signal and the timing reference is generated through dividing the timing result.

In some embodiments, the method comprises the following steps of if the detection signal indicates that the dimmer is a leading-edge dimmer, enabling the bleeder when a phase angle of a bus voltage signal is between 0 degree and a first degree, and disabling the bleeder when the sine angle value of a bus voltage signal is between the first degree and 180 degrees; and if the detection signal indicates that the dimmer is a trailing-edge dimmer, enabling the bleeder when the sine angle value of a bus voltage signal is between 0 degree and a second degree, and disabling the bleeder when the sine angle value of a bus voltage signal is between the second degree and 180 degrees; and if the detection signal indicates that non-existence of the dimmer, disabling the bleeder.

As described above, the bleeder
control circuit, a drive system, and a method for controlling a bleeder in the present application have the following beneficial effects: through enabling a bleeder circuit within a given phase interval based on a control signal of the bleeder circuit which is generated according to a detection signal indicating existence and a type of the dimmer; therefore, the power consumption of the bleeder circuit can be reduced in case of ensuring steady operation of the dimmer or the dimming device.

DETAILED DESCRIPTION OF THE PREFERRED EMBODIMENTS

Figure 1:
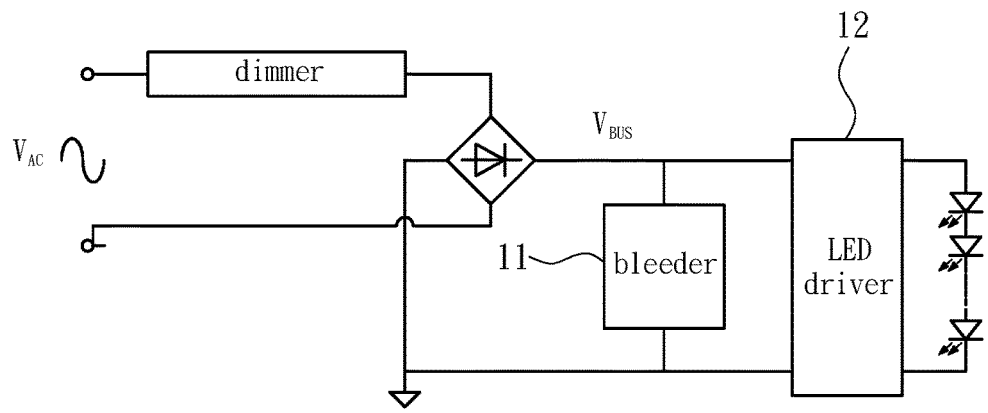
FIG. 1 is a structural schematic diagram of an LED driver system applied to a dimmer in the prior art.

Implementations of the present application will be described below through specific embodiments, and those skilled in the art can easily understand other advantages and effects of the present application from the contents disclosed in the present specification.

It should be noted that, the structures, proportions, sizes and the like drawn in the figures of the present specification are merely used for coordinating with the contents disclosed in the specification, so as to facilitate understanding and reading by those skilled in the art, rather than for limiting the qualifications based on which the present application can be implemented. Therefore, they do not have substantive technical meanings. Any modification of the structure, variation of the proportional relationship or adjustment of the size shall all fall within the scope of the technical contents disclosed by the present application on the premise of not influencing the efficacy generated by the present application and the purpose achieved by the present application. Meanwhile, such terms as "up", "down", "left", "right", "middle" and "one" referred to in the present specification are merely used for a clear description, rather than for defining the scope in which the present application can be implemented, the variation or adjustment of the relative relationship in the structures shall be deemed as falling within the scope in which the present application can be implemented under the premise of not having a substantive change of the technical contents.

Moreover, as used herein, such single forms as "one", "a" and "the" aim at also including the plural forms, unless contrarily indicted in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

Generally, in a lighting system with a dimmer or a dimming device, a driver of the lighting equipment comprises a bleeder which is coupled to a rectifier bridge in parallel due to the characteristics of the dimmer or the dimming device. The bleeder is always in an working state to provides additional current when the main power loop current is not sufficient enough to maintain the dimmer being in a normal conductive state. Under this condition, the voltage rectified by a rectifier bridge is very high and the bleeder will generate greater power consumption, thereby causing an unfavorable influence to the reliability of the system. In view of this, the present application provides a bleeder control circuit which is configured to control the bleeder to be operated within a given interval, so as to reduce the power consumption of the bleeder while ensuring steady operation of the dimmer or the dimming device.

Figure 2:
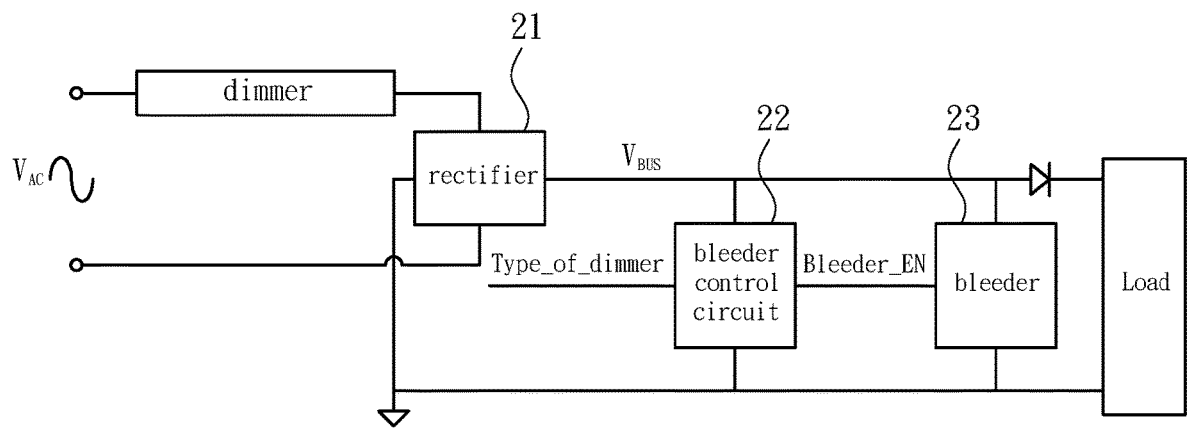
FIG. 2 is a structural schematic diagram of a bleeder control circuit in the present application in one embodiment.

Please refer to FIG. 2, which is a structural schematic diagram of a bleeder control circuit in one embodiment of the present application. As shown in FIG. 2, a current output from a dimming device, which is coupled to an external AC input, is rectified by a rectifier 21. A bleeder control circuit 22 and a bleeder 23 are coupled to the rectifier 21. The bleeder control circuit 22 receives a detection signal (Type_of_dimmer) output by a dimmer detector and generates a control signal (Bleeder_EN) of the bleeder 23 based on the detection signal (Type_of_dimmer). The control signal (Bleeder_EN) is a signal based on which the bleeder control circuit 22 can control an operating state of the bleeder 23. The dimmer detector is configured to detect existence and detect a type of the dimming device to generate a detection signal accordingly, and output a detection signal.

The dimming device can be a dimmer, and is usually arranged between an AC input power and a rectifier bridge. The dimmer is an electric device configured to change luminous flux of a light source in lighting equipment (a load) and regulate an luminance levels. In some embodiments, the dimmer can be a leading-edge phase dimmer or a trailing-edge phase dimmer. Further, regarding the implementation of the dimmer detector, please refer to the dimmer detector described in the US Patent Publication No. US 2019150240A1. The dimmer detector detects existence and detects whether the dimmer is a leading-edge phase dimmer or a trailing-edge phase dimmer if the dimmer is existent, and the dimmer detector outputs a detection signal based on the detection result.

Figure 3:
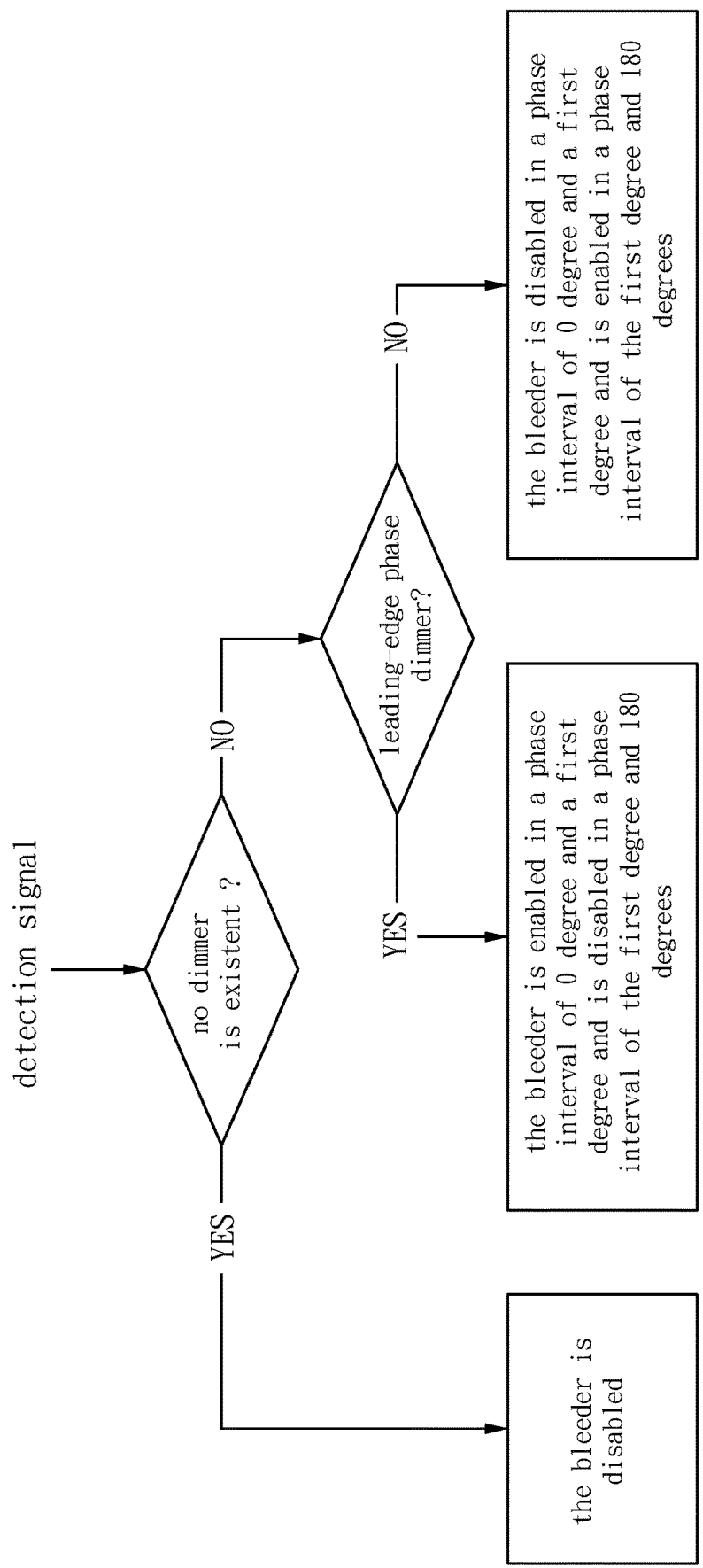
FIG. 3 is a flow chart showing that a bleeder control circuit of the present application controls an operating state of the bleeder based on a detection signal.

Further, the bleeder control circuit 22 generates a control signal of the bleeder 23 based on the detection signal which indicates whether a dimmer is existent and the type of the dimmer, so as to control the operating state of the bleeder 23. Please refer to FIG. 3, which is a flow chart for the bleeder control circuit controlling the operating state of the bleeder based on a detection signal. As shown in FIG. 3, if the detection signal indicates non-existence of the dimmer, the bleeder control circuit generates a control signal which indicates that the bleeder is disabled, so as to disable the bleeder. If the detection signal indicates that a dimmer is existent and the dimmer is a leading-edge phase dimmer, the bleeder control circuit generates a control signal to enable the bleeder in a phase interval of 0 degree and a first degree, and to disable the bleeder in a phase interval of the first degree and 180 degrees, so as to enable the bleeder when the sine angle value of the bus voltage signal is between 0 degree and the first degree, and to disable the bleeder when the sine angle value of the bus voltage signal is between the first degree and 180 degrees. In one embodiment, the first degree is 90 degrees. If the detection signal indicates that a dimmer is existent and the dimmer is not a leading-edge phase dimmer, that is to say, when the dimmer is a trailing-edge phase dimmer, the bleeder control circuit generates a control signal to disable the bleeder in a phase interval of 0 degree and a second degree, and to enable the bleeder in a phase interval of the second degree and 180 degrees, so as to disable the bleeder when the sine angle value of the bus voltage signal is between 0 degree and the second degree, and enable the bleeder when the sine angle value of the bus voltage signal is between the second degree and 180 degrees. In one embodiment, the second degree is 90 degrees. The bus refers to a power supply transmission line for transmitting the input AC power source which is rectified to a load.

It should be noted that, the ranges of the phase interval as mentioned above are merely exemplary, and the present application is not limited hereto. A proper range of phase interval can be selected by those skilled in the art depending on actual requirements, and will not be described herein.

Accordingly, the bleeder control circuit of the present application generates a control signal of a bleeder based on a detection signal which indicates existence and a type of the dimmer to control the operate state of the bleeder within a given phase interval, thereby reducing the power consumption of the bleeder while ensuring steady operation of the dimmer or the dimming device.

Figure 4:
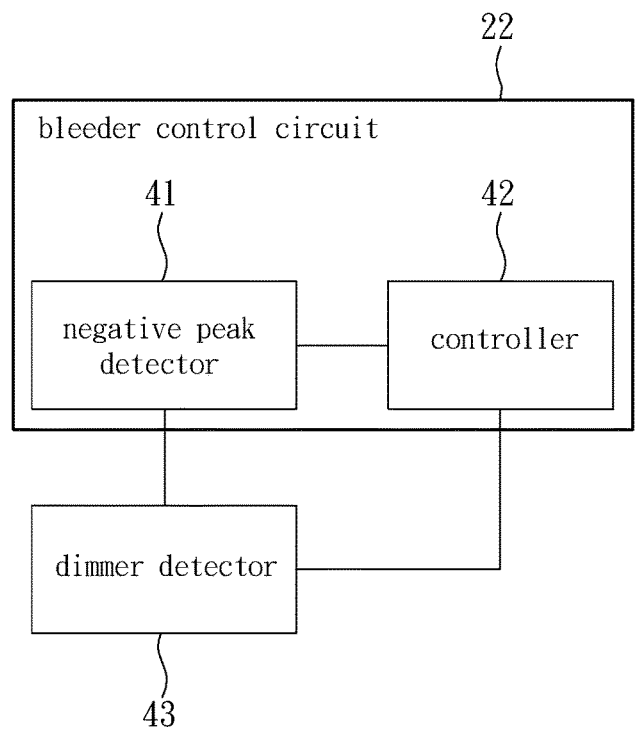
FIG. 4 is a structural schematic diagram of a bleeder control circuit of the present application in another embodiment.

Please refer to FIG. 4, which is a structural schematic diagram of a bleeder control circuit in another embodiment of the present application. As shown in FIG. 4, a bleeder control circuit 22 includes a negative peak detector 41 and a controller 42, wherein the negative peak detector 41 is coupled to a dimmer detector 43, and the controller 42 is coupled to the negative peak detector 41 and the dimmer detector 43. In addition, the dimmer detector 43 is the same as or similar to the above dimmer detector, and will not be described herein.

Figure 5:
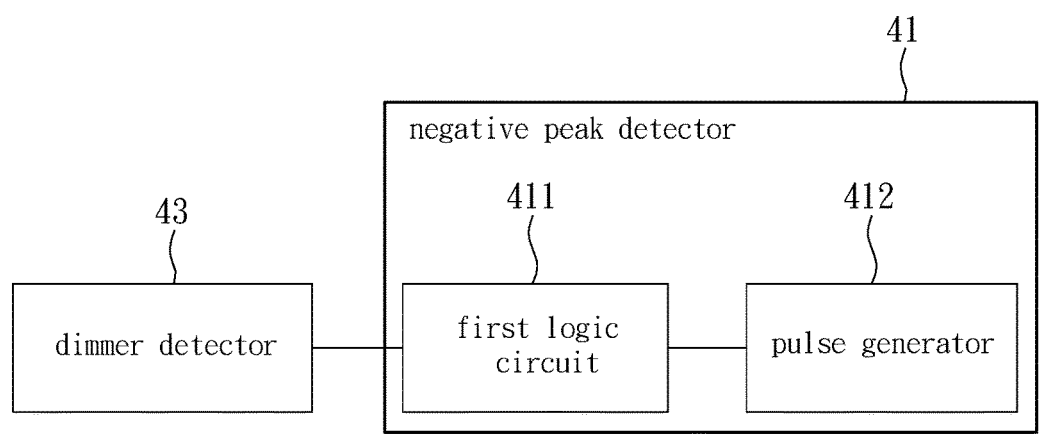
FIG. 5 is a structural schematic diagram of a negative peak detector in a bleeder control circuit of the present application in one embodiment.

In some embodiments, the negative peak detector 41 receives an electric signal indicating the bus voltage and a detection signal output by the dimmer detector 43 to generate a timing signal. In one embodiment, the negative peak detector 41 is coupled to a bus to acquire the electric signal indicating bus voltage directly. In another embodiment, the negative peak detector 41 acquires the electric signal indicating the bus voltage through other manners known by those skilled in the art. For example, the negative peak detector acquires the electric signal indicating bus voltage through a divided resistor. Please refer to FIG. 5, which is a structural schematic diagram of a negative peak detector 41 in a bleeder control circuit in one embodiment of the present application. As shown in FIG. 5, the negative peak detector 41 includes a first logic circuit 411 and a pulse generator 412, wherein the first logic circuit 411 is coupled to a dimmer detector 43 and the pulse generator 412. The first logic circuit 411 generates an executive signal based on the electric signal and a detection signal output by the dimmer detector 43. The pulse generator 412 outputs a timing signal based on the executive signal generated by the first logic circuit. In the present application, the executive signal is represented by a high level and a low level which will be described below.

Figure 6:
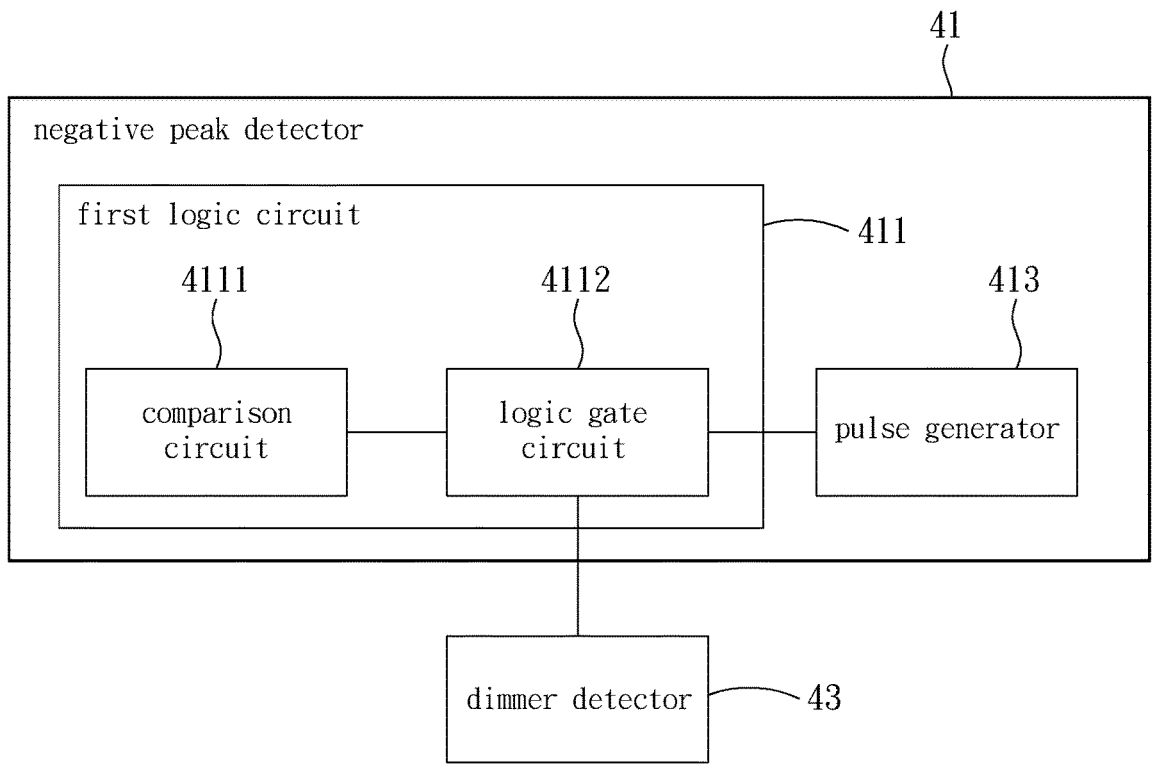
FIG. 6 is a structural schematic diagram of a negative peak detector in a bleeder control circuit of the present application in another embodiment.

Please refer to FIG. 6, it is a structural schematic diagram of a negative peak detector 41 in a bleeder control circuit in one embodiment, which is under the condition that the dimmer detector is configured to detect existent and a type of the dimmer. As shown in FIG. 6, the negative peak detector 41 includes a first logic circuit 411 and a pulse generator 413, wherein the first logic circuit 411 includes a comparison circuit 4111 and a logic gate circuit 4112. The logic gate circuit 4112 is coupled to the comparison circuit 4111 and a dimmer detector 43 and the pulse generator 413.

In some embodiments, the comparison circuit 4111 receives an electric signal indicating the bus voltage and compares the electric signal indicating the bus voltage with a preset baseline voltage to output a comparison signal. The logic gate circuit 4112 performs a logic operation on the received comparison signal output by the comparison circuit 4111 with the detection signal output by the dimmer detector, and outputs a executive signal. The pulse generator 413 outputs a timing signal based on the executive signal generated by the logic gate circuit 4112.

Figure 7:
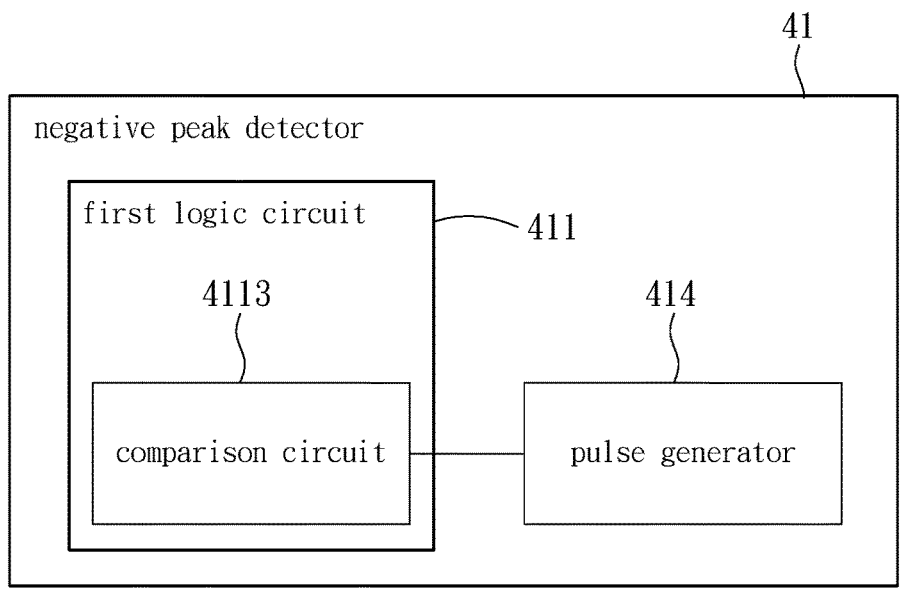
FIG. 7 is a structural schematic diagram of a negative peak detector in a bleeder control circuit of the present application in yet another embodiment.

However, in actual implementations, the type of a dimmer (for example, a leading-edge phase dimmer or a trailing-edge phase dimmer) may be known in advance, so the dimmer detector only needs to detect existence of the dimmer. Please refer to FIG. 7, it is a structural schematic diagram of a negative peak detector 41 in a bleeder control circuit in another embodiment that the dimmer is known as a leading-edge phase dimmer and the dimmer detector is configured to detect existence of the dimmer. As shown in FIG. 7, the negative peak detector 41 includes a first logic circuit 411 and a pulse generator 414, wherein the first logic circuit 411 includes a comparison circuit 4113 coupled to the pulse generator 414. In some embodiments, the comparison circuit 4113 receives an electric signal indicating the bus voltage, and compares the electric signal indicating the bus voltage with a preset baseline voltage to output a comparison signal. The pulse generator 414 outputs a timing signal based on the comparison signal generated by the comparison circuit 4113.

Figure 8:
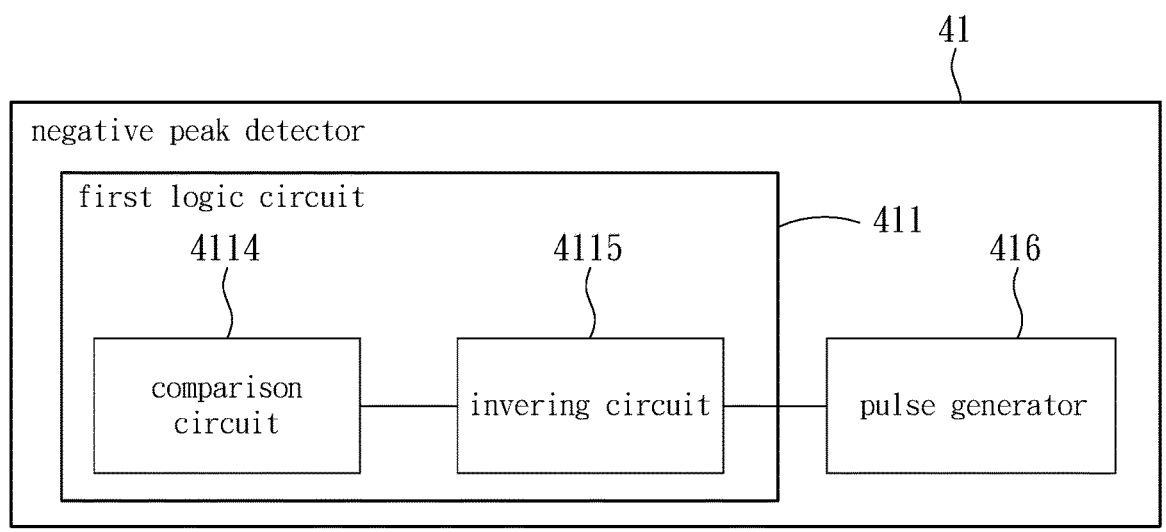
FIG. 8 is a structural schematic diagram of a negative peak detector in a bleeder control circuit of the present application in another embodiment.

Please refer to FIG. 8, it is a structural schematic diagram of a negative peak detector 41 in a bleeder control circuit in another embodiment that the dimmer is known as a trailing-edge phase dimmer and the dimmer detector is configured to detect existence of the dimmer. As shown in FIG. 8, the negative peak detector 41 includes a first logic circuit 411 and a pulse generator 416, wherein the first logic circuit 411 includes a comparison circuit 4114 and an inverting circuit 4115 coupled to the comparison circuit 4114 and the pulse generator 416. In some embodiments, the comparison circuit 4114 receives an electric signal indicating bus voltage, and compares the electric signal indicating bus voltage with a preset baseline voltage to output a compared signal. The inverting circuit 4115 performs an inverting processing on the comparison signal output by the comparison circuit 4114 to output a executive signal. The pulse generator 416 outputs a timing signal based on the executive signal generated by the inverting circuit 4115.

In the present application, the controller 42 starts timing based on the timing signal, generates a trigger signal when a timing result is equal to a timing reference, and outputs a control signal based on the trigger signal and the detection signal. The timing is performed by a timer. In some embodiments, the timer includes a first capacitor circuit, and the timing is performed through charging-discharging of the capacitor in the first capacitor circuit. The timing reference is set in advance, for example, the timing reference is preset to be a digital signal or an analogue signal depending on the requirements. In some embodiments, the timing reference is preset as an analogue signal which are acquired through a reference voltage source; or the timing reference is preset as a digital signal with high or low levels; or the timing reference is preset as a digital signal or an analogue signal which is calculated based on a measurement of a power frequency cycle, so as to be appropriate for grid standards of different countries.

Figure 9:
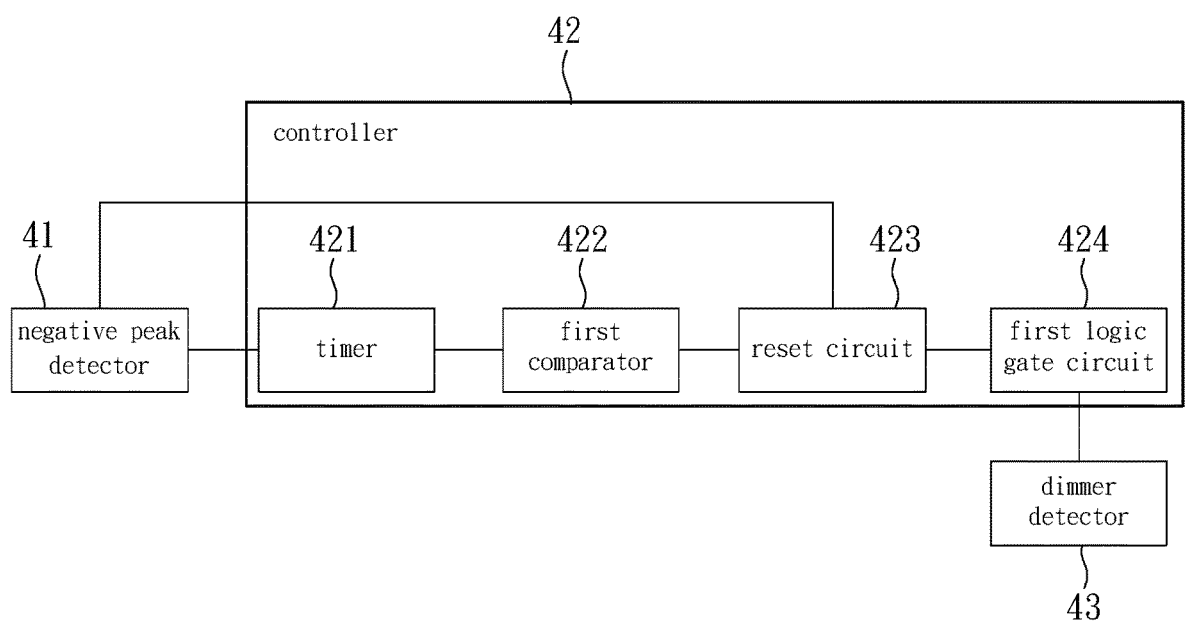
FIG. 9 is a structural schematic diagram of a controller in a bleeder control circuit of the present application in one embodiment.

Please refer to FIG. 9, which is a structural schematic diagram of a controller 42 in a bleeder control circuit in one embodiment of the present application. As shown in FIG. 9, the controller 42 includes a timer 421, a first comparator 422, a reset circuit 423 and a first logic gate circuit 424. The timer 421 is coupled to a negative peak detector, the first comparator 422 is coupled to the timer 421, the reset circuit 423 is coupled to the first comparator 422 and the negative peak detector 41, and the first logic gate circuit 424 is coupled to the reset circuit 423 and a dimmer detector 43. In some embodiments, the timer 421 receives a timing signal output by the negative peak detector 41 and starts timing based on a clock signal. The first comparator 422 compares a timing result output by the timer 421 with a predetermined timing reference and outputs a reset signal when the timing is equal to the timing reference. The reset circuit 423 generates a trigger signal based on the timing signal when the reset circuit 423 receives the reset signal output by the first comparator 422. The first logic gate circuit 424 outputs a control signal based on the detection signal when the first logic gate circuit 424 receives the trigger signal.

Figure 10:
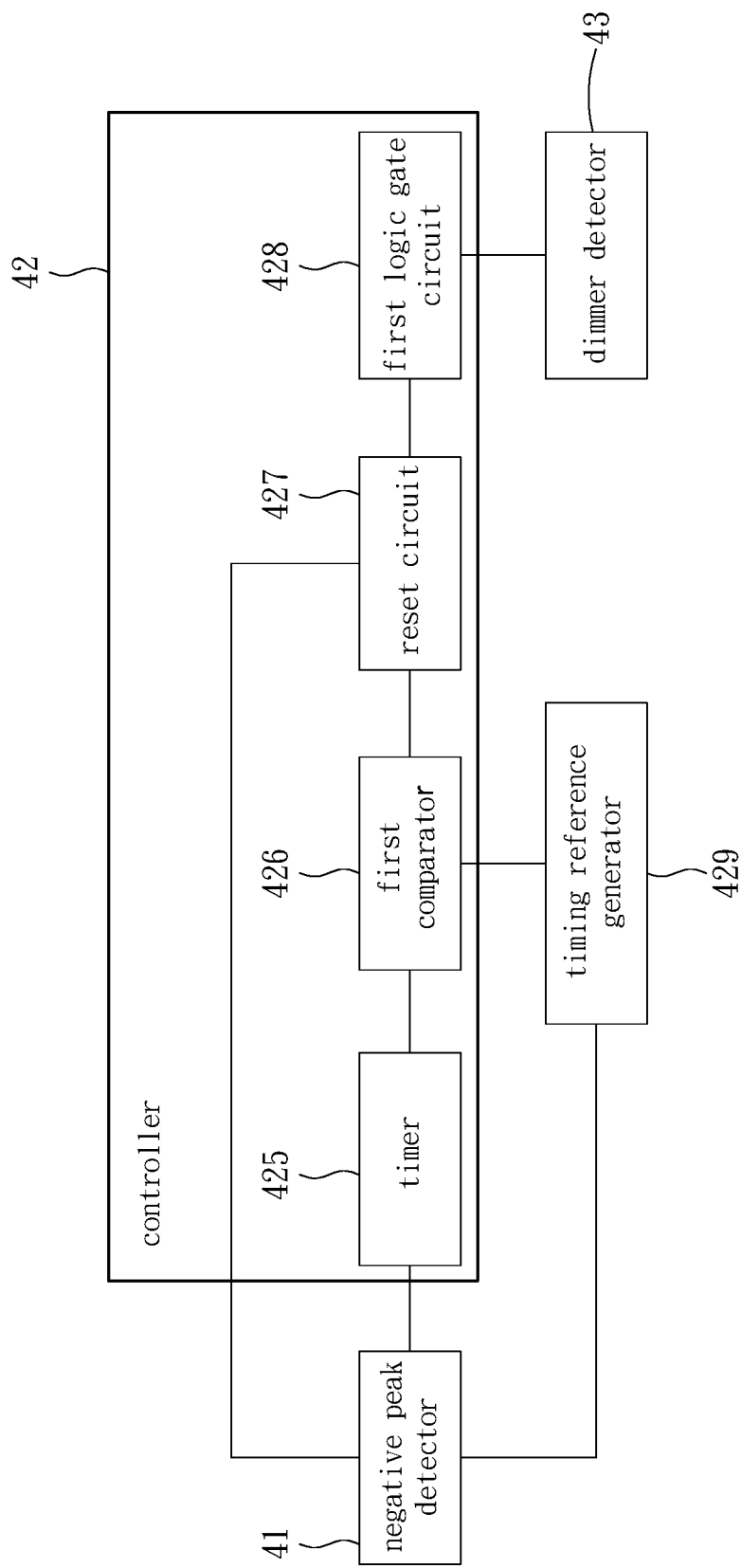
FIG. 10 is a structural schematic diagram of a controller in a bleeder control circuit of the present application in another embodiment.

Please refer to FIG. 10, it is a structural schematic diagram of a controller 42 in a bleeder control circuit in another embodiment, which is under the condition that the timing reference is calculated based on a measurement of a power frequency cycle. As shown in FIG. 10, the controller 42 includes a timer 425, a timing reference generator 429, a first comparator 426, a reset circuit 427 and a first logic gate circuit 428. The timer 425 is coupled to a negative peak detector 41, the timing reference generator 429 is coupled to the negative peak detector 41 and the timer 425, the first comparator 426 is coupled to the timer 425 and the timing reference generator 429, the reset circuit 427 is coupled to the first comparator 426 and the negative peak detector 41, and the first logic gate circuit 428 is coupled to the reset circuit 427 and a dimmer detector 43. In some embodiments, the timer 425 receives a timing signal output by the negative peak detector 41 and starts timing based on a clock signal. The timing reference generator 429 generates a timing reference based on the clock signal and the timing signal output by the negative peak detector 41. The first comparator 426 compares a timing result output by the timer 425 with the timing reference output by the timing reference generator 429, and outputs a reset signal when the timing result is equal to the timing reference. The reset circuit 427 generates a trigger signal based on the timing signal when the reset circuit 427 receives the reset signal output by the first comparator 426. The first logic gate circuit 428 outputs a control signal based on the detection signal when the first logic gate circuit 428 receives the trigger signal.

Figure 11:
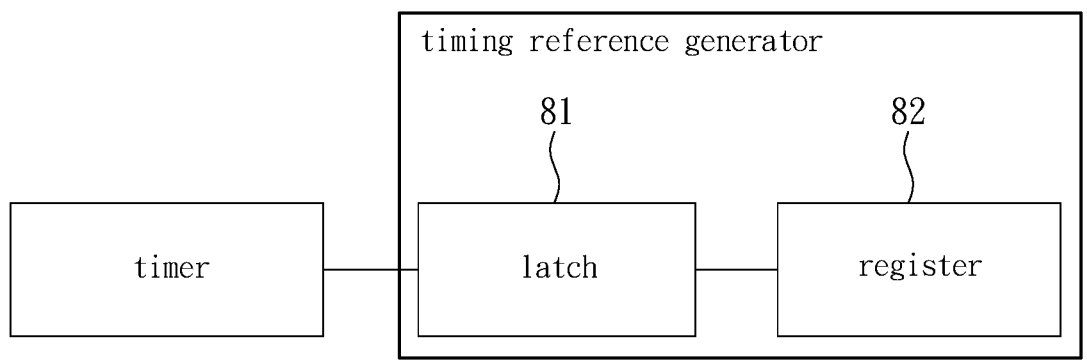
FIG. 11 is a structural schematic diagram of a timing reference generator in a bleeder control circuit of the present application in one embodiment.

When the timing reference is a digital signal, please refer to FIG. 11, which is a structural schematic diagram of a timing reference generator in a bleeder control circuit in one embodiment of the present application. As shown in FIG. 11, the timing reference generator includes a latch 81 and a register 82. The latch 81 is coupled to the timer and the register 82. In one embodiment, the latch 81 latches a timing result of the timer, then the register 82 shifts and registers the latched timing result, and then calculates to generate a timing reference.

Figure 12:
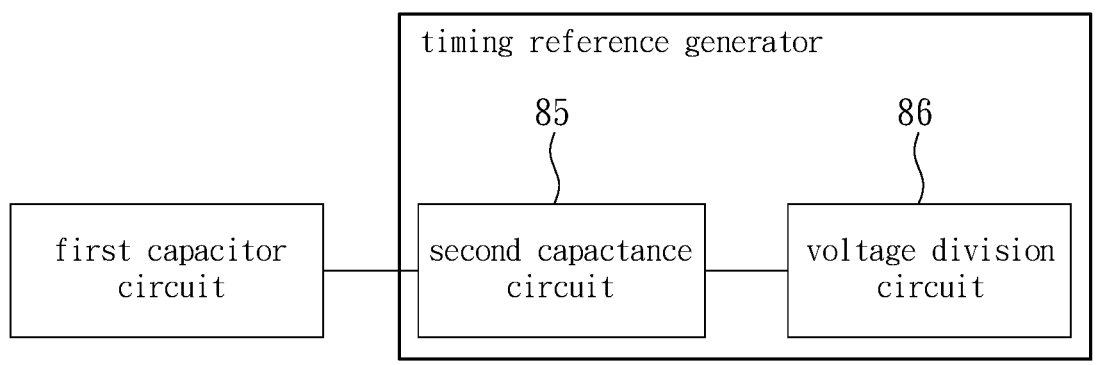
FIG. 12 is a structural schematic diagram of a timing reference generator in a bleeder control circuit of the present application in another embodiment.

When the timing reference is an analogue signal, the timer includes a first capacitor circuit, and the timer records time through charging-discharging of a first capacitor. Please refer to FIG. 12, which is a structural schematic diagram of a timing reference generator in a bleeder control circuit in another embodiment of the present application. As shown in FIG. 12, the timing reference generator includes a second capacitor circuit 85 and a voltage divider 86. The second capacitor circuit 85 is coupled to the first capacitor circuit and the voltage divider 86. In one embodiment, the second capacitor circuit 85 latches the timing result from the first capacitor circuit, then the voltage divider 86 divides the latched timing result to generate a timing reference.

Specifically, in order to describe clearly, a bleeder control circuit including a negative peak detector and a controller is taken as an example in the following contents. The negative peak detector includes a first logic circuit and a pulse generator, and the controller includes a timer, a timing reference generator, a first comparator, a reset circuit and a first logic gate circuit. The timing reference generator includes a latch and a register. However, the present application is not limited hereto, and variations and modifications can be made by those skilled in the art without departing from the scope recited in the present application.

Figure 13:
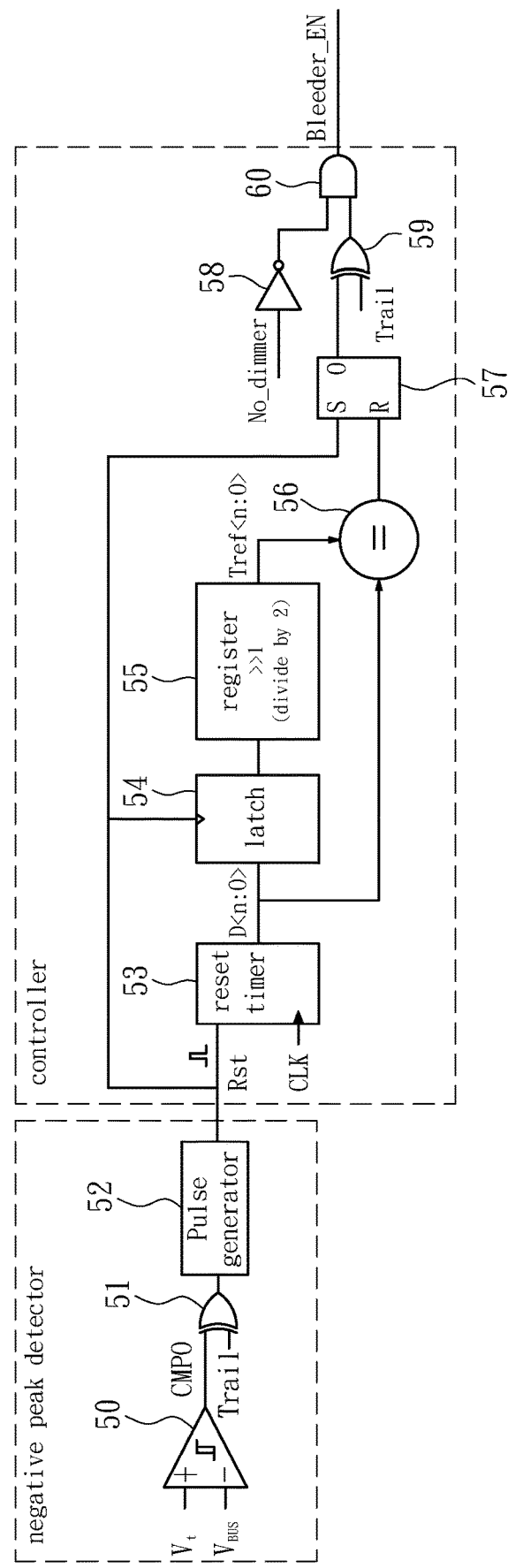
FIG. 13 is a structural schematic diagram of a bleeder control circuit of the present application in one embodiment.

Please refer to FIG. 13, it is a structural schematic diagram of a bleeder control circuit in one embodiment that the dimmer detector is configured to detect existence and a type of the dimmer. As shown in FIG. 13, the bleeder control circuit includes a negative peak detector and a controller. In this embodiment, the first logic circuit in the negative peak detector includes a second comparator 50 and a first exclusive-OR gate (XOR gate) 51, and the pulse generator in the negative peak detector is a pulse generator 52. The pulse generator 52 in the negative peak detector outputs a narrow pulse which indicates a negative peak. The controller includes a timer 53, a timing reference generator including a latch 54 and a register 55, a first comparator 56, a reset circuit including a RS trigger 57, and a first logic gate circuit including a second XOR gate 59, an inverter 58 and an AND gate 60. In one embodiment, the timer 53 counts continuously and is cleared at each negative peak, and an clock signal (CLK) is generated by an internal oscillator. The latch 54 latches the result of the timer 53 before the timer 53 is cleared at each negative peak, and the output of the latch 54 represents the power frequency cycle. The register 55 is a shift register which right shifts the output of the latch 54 by 1 bit, so that the binary number is divided by two, and the output of the register 55 is used as a timing reference. The RS trigger 57 is set at the negative peak, and is reset when the output of the timer 53 is equal to the timing reference. The second XOR gate 59 and the AND gate 60 output a control signal based on the output of the RS trigger 57 and the type of the dimmer, wherein the control signal is output to control the bleeder.

Figure 14A:
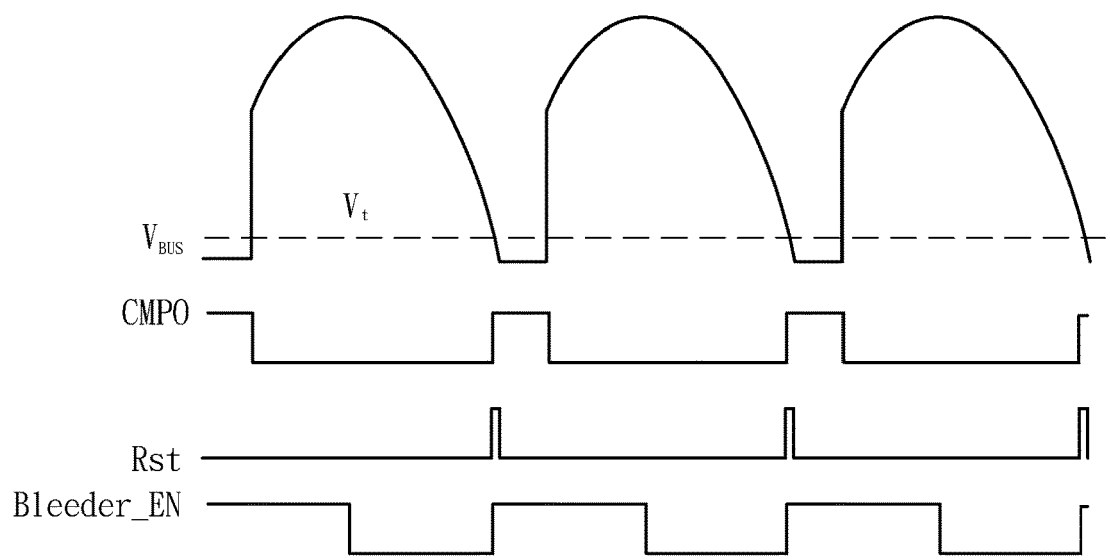
FIG. 14a and FIG. 14b are waveform schematic diagrams of related electric signals in a bleeder control circuit of the present application.
Figure 14B:
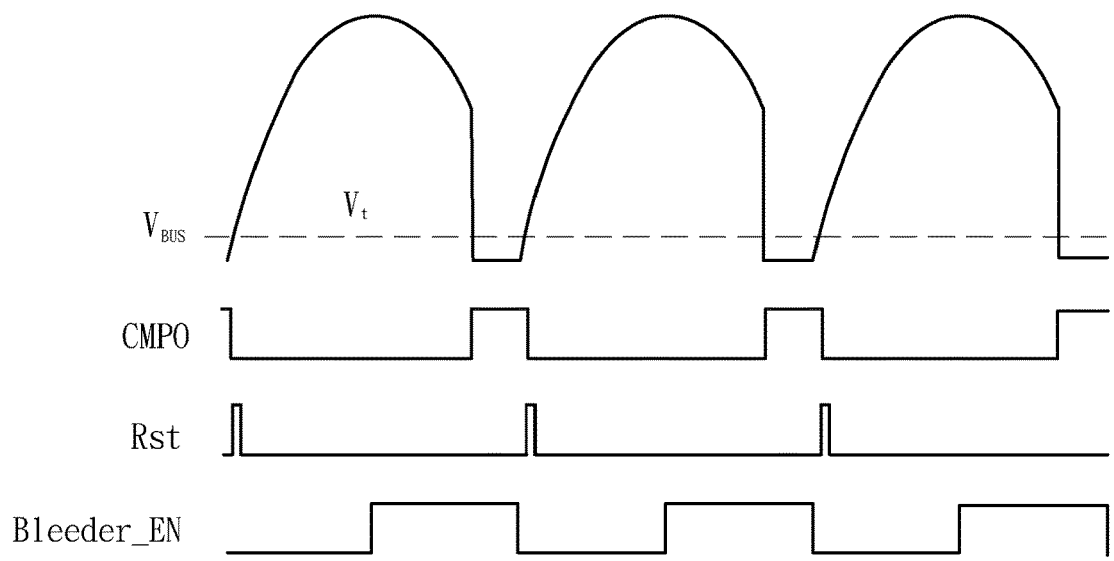

In addition, FIG. 14a and FIG. 14b are waveform schematic diagrams of related electric signals in a bleeder control circuit of the present application. FIG. 14a shows the waveforms of related electric signals when a leading-edge phase dimmer is connected, and FIG. 14b shows the waveforms of related electric signals when a trailing-edge phase dimmer is connected. In combination with FIG. 13, FIG. 14a and FIG. 14b, the second comparator 50 receives an electric signal ($V_t$) indicating reference voltage and an electric signal ($V_{Bus}$) indicating bus voltage. In this embodiment, when the electric signal ($V_{BUS}$) is greater than the electric signal ($V_t$), the output compared result (CMPO) is a low level signal; and when the electric signal ($V_{BUS}$) is smaller than the electric signal ($V_t$), the output compared result (CMPO) is a high level signal. The first XOR gate 51 receives the compared result (CMPO) and a detection signal provided by the dimmer detector and then performs XOR logic operation. The detection signal includes a first signal indicating that a leading-edge phase dimmer is existent, a second signal indicating that a trailing-edge phase dimmer is existent, and a third signal indicating non-existence of the dimmer. Specifically, a "Trail" terminal and a "No_dimmer" terminal receive the detection signal. In the following embodiment, the "Trail" terminal with a low level indicates that a leading-edge phase dimmer is existent, the"Trail" terminal with a high level indicates that a trailing-edge phase dimmer is existent, and the "No_dimmer" terminal with a high level indicates non-existence of the dimmer.

As shown in FIG. 14a, the detection signal is the first signal which indicates that a leading-edge phase dimmer is existent, namely, the "Trail" terminal is at low level, and the "No_dimmer" terminal is at low level. When a negative peak is detected, the pulse generator 52 outputs a narrow pulse signal (Rst) based on the electric signal ($V_{BUS}$) and the electric signal ($V_t$) at an rising edge of the compared result (CMPO), which is also at an rising edge of the result output by the first XOR gate 51. On one hand, the RS trigger 57 is set based on the narrow pulse signal (Rst), that is, the output terminal (Q) is at high level. An XOR operation is performed on the output terminal (Q) with high level and the "Trail" terminal with low level to output a high level. In addition, since the dimmer signal ("No_dimmer" signal) is a low level, the "No_dimmer" signal becomes a high level signal after the low level "No_dimmer" signal is inverted by the inverter 58. Then, a logic AND operation is performed on the inverted "No_dimmer" signal and the high level which is output through the XOR operation to output a high level, that is, the output control signal (Bleeder_EN) is a high level. Therefore, the bleeder is enabled. On the other hand, the timer 53 receives the narrow pulse signal (Rst) and starts timing based on the clock signal (CLK), the latch 54 latches the timing result (D) output by the timer 53, and the register 55 right shifts the timing result (D) by 1 bit, so that the binary number is divided by two to generate a timing reference (Tref) to the first comparator 56. When the timing result (D) output by the timer 53 is equal to the timing reference (Tref), the RS trigger 57 is reset, and the output terminal (Q) of the RS trigger 57 is at low level, and an XOR operation is performed on the output terminal (Q) with low level and the "Trail" terminal with low level to output a low level. In addition, since the dimmer signal ("No_dimmer" signal) is a low level signal, the "No_dimmer" signal becomes a high level signal after the low level "No_dimmer" signal is inverted by the inverter 58. Then a logic AND operation is performed on the inverted "No_dimmer" signal and the low level which is output through the XOR operation to output a low level, that is, the output control signal (Bleeder_EN) is a low level. Therefore, the bleeder is disabled. In this embodiment, since the register 55 divides the binary number by two, in half of a power frequency cycle, when the sine angle value of the bus voltage signal is between 0 degree and 90 degrees, the bleeder is enabled based on the control signal; and when the sine angle value of the bus voltage signal is between 90 degrees and 180 degrees, the bleeder is disabled based on the control signal.

As shown in FIG. 14b, the detection signal is the second signal which indicates that a trailing-edge phase dimmer is existent, namely, the "Trail" terminal is at high level, and the "No_dimmer" terminal is at low level, when a negative peak is detected, the pulse generator 52 outputs a narrow pulse signal (Rst) based on the electric signal ($V_{BUS}$) and the electric signal ($V_t$) at a falling edge of the compared result (CMPO), which is also at an rising edge of the result output by the first XOR gate 51. On one hand, the RS trigger 57 is set based on the narrow pulse signal (Rst), that is, the output terminal (Q) is at high level. An XOR operation is performed on the output terminal (Q) with high level and the "Trail" terminal with high level to output a low level. In addition, since the dimmer signal ("No_dimmer" signal) is a low level signal, the "No_dimmer" signal becomes a high level signal after the low level "No_dimmer" signal is inverted by the inverter 58. Then a logic AND operation is performed on the inverted "No_dimmer" signal and the low level which is output through the XOR operation to output a low level, that is, the output control signal (Bleeder_EN) is a low level. Therefore, the bleeder is disabled. On the other hand, the timer 53 receives the narrow pulse signal (Rst) and starts timing based on the clock signal (CLK), the latch 54 latches the timing result (D) output by the timer 53, and the register 55 right shifts the timing result (D) by 1 bit, so that the binary number is divided by two to generate a timing reference (Tref) at the first comparator 56. When the timing result (D) output by the timer 53 is equal to the timing reference (Tref), the RS trigger 57 is reset, the output terminal (Q) of the RS trigger 57 is at low level, and an XOR operation is performed on the output terminal (Q) with low level and the "Trail" terminal with high level to output a high level. In addition, since the dimmer signal ("No_dimmer" signal) is a low level signal, the "No_dimmer" signal becomes a high level signal after the low level "No_dimmer" signal is inverted by the inverter 58. Then a logic AND operation is performed on the inverted "No_dimmer" signal and the high level which is output through the XOR operation to output a high level, that is, the output control signal (Bleeder_EN) is a high level, thereby the bleeder is enabled. In this embodiment, since the register 55 divides the binary number by two, in half of a power frequency cycle, when the sine angle value of the bus voltage signal is between 0 degree and 90 degrees, the bleeder is diabled based on the control signal; and when the sine angle value of the bus voltage signal is between 90 degrees and 180 degrees, the bleeder is enabled based on the control signal.

When the detection signal is the third signal which indicates non-existence of the dimmer, the signal at "No_dimmer" terminal is at high level, and the "No_dimmer" signal becomes a low level signal after the high level signal at "No_dimmer" terminal is inverted by the inverter 58. Then, a low level is output when a logic AND operation is performed on the inverted "No_dimmer" signal and any level, that is, the output control signal (Bleeder_EN) is a low level and the bleeder is disabled. Therefore, when the detection signal indicates non-existence of the dimmer, the bleeder is diabled based on the control signal.

It should be noted that, those skilled in the art should understand that the electric signal accessed into a positive input terminal and a negative input terminal of a comparator can be interchanged according to actual design of a circuit, namely, an electric signal ($V_{BUS}$) indicating bus voltage is accessed to a positive input terminal of the comparator, while an electric signal ($V_t$) indicating reference voltage is accessed to a negative input terminal of the comparator, and the corresponding control circuit logics and waveforms of related electric signals will not be described in detail herein. In addition, the above setting of a high level and a low level at the "Trail" terminal are merely exemplary, and the present application is not limited hereto. For example, the "Trail" terminal at a low level indicates that a trailing-edge phase dimmer is existent, and the "Trail" terminal at a high level indicates that a leading-edge phase dimmer is existent, and these will not be described herein.

Figure 15:
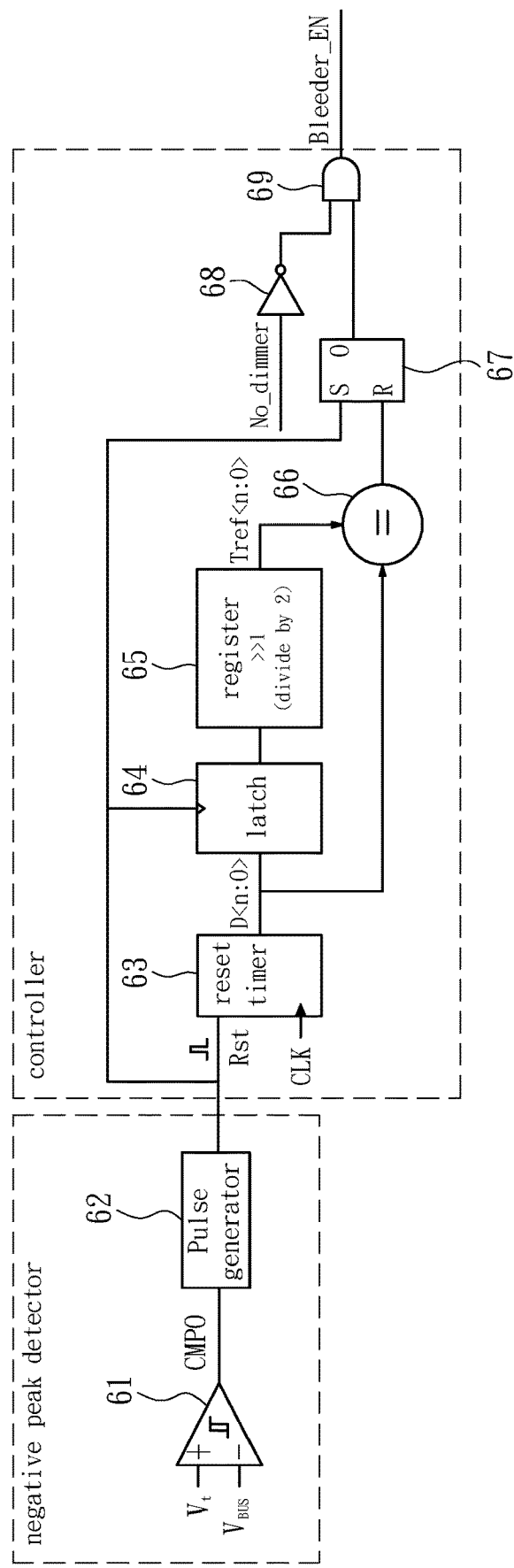
FIG. 15 is a structural schematic diagram of a bleeder control circuit of the present application in another embodiment.

Please refer to FIG. 15, it is a structural schematic diagram of a bleeder control circuit in another embodiment that the dimmer is a leading-edge phase dimmer and the dimmer detector is configured to detect existence of the dimmer. As shown in FIG. 15, the bleeder control circuit includes a negative peak detector and a controller. In this embodiment, the first logic circuit in the negative peak detector includes a second comparator 61 and a pulse generator 62. The pulse generator 62 in the negative peak detector outputs a narrow pulse which indicates a negative peak. The controller includes a timer 63, a timing reference generating circuit including a latch 64 and a register 65, a first comparator 66, a reset circuit including a RS trigger 67, and a first logic gate circuit including an inverter 68 and an AND gate 69. In one embodiment, the timer 63 counts continuously and is cleared at each negative peak, and an clock signal (CLK) is generated by an internal oscillator. The latch 64 latches the result of the timer 63 before the timer 63 is cleared at each negative peak, and the output of the latch 64 represents the power frequency cycle. The register 65 is a shift register which right shifts the output of the latch 64 by 1 bit, so that the binary number is divided by two, and the output of the register 65 is used as a timing reference. The RS trigger 67 is set at the negative peak, and at the first comparator 66, the RS trigger 67 is reset when the output of the timer 63 is equal to the timing reference. The AND gate 69 outputs a control signal based on the output of the RS trigger 67 and the type of the dimmer, wherein the control signal is output to control the bleeder.

Figure 16:
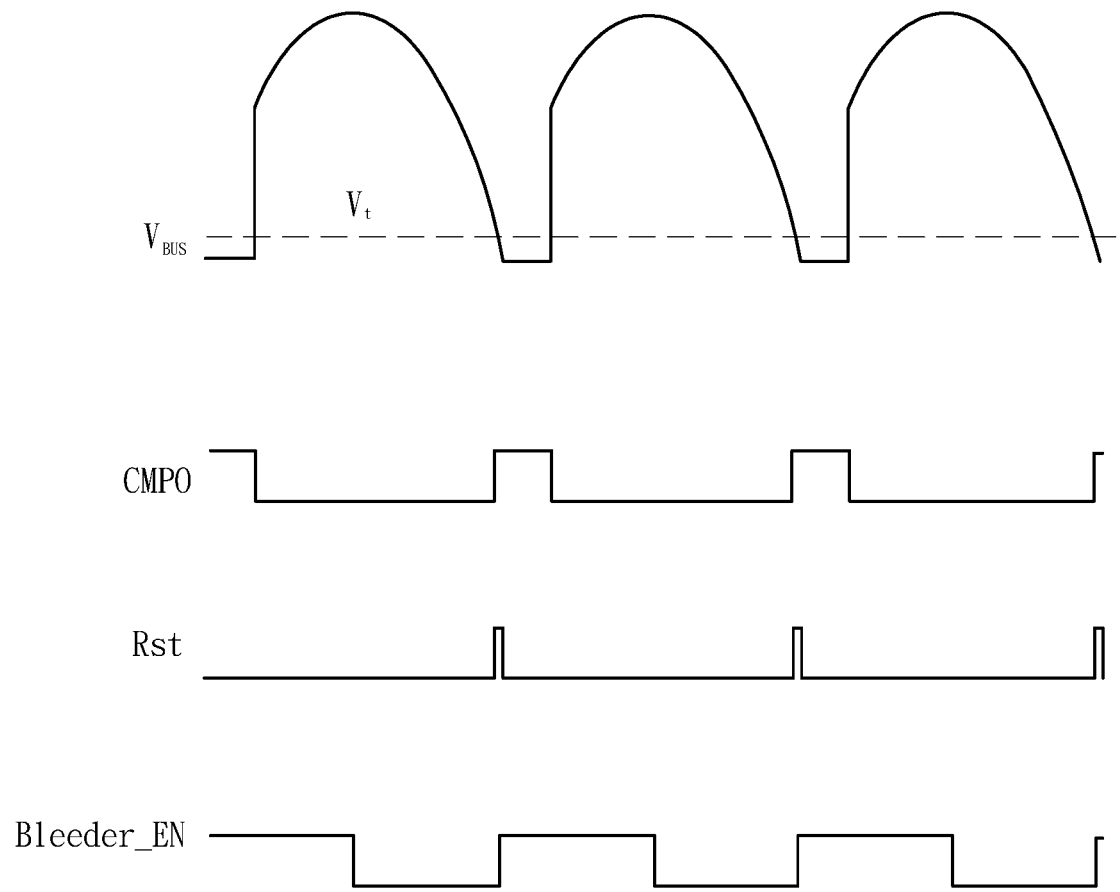
FIG. 16 are waveform schematic diagrams of related electric signals in a bleeder control circuit of the present application.

In addition, FIG. 16 shows waveforms of related electric signals in a bleeder control circuit of the present application. In combination with FIG. 15 and FIG. 16, the second comparator 61 receives an electric signal ($V_t$) indicating reference voltage and an electric signal ($V_{BUS}$) indicating bus voltage. In this embodiment, when the electric signal ($V_{BUS}$) is greater than the electric signal ($V_t$), the output compared result (CMPO) is a low level signal; and when the electric signal ($V_{BUS}$) is smaller than the electric signal ($V_t$), the output compared result (CMPO) is a high level signal. When a negative peak is detected, the pulse generator 62 outputs a narrow pulse signal (Rst) based on the electric signal ($V_{BUS}$) and the electric signal ($V_t$) at an rising edge of the compared result (CMPO). On one hand, the RS trigger 67 is set based on the narrow pulse signal (Rst), that is, the output terminal (Q) is at high level. In addition, since the dimmer signal ("No_dimmer" signal) is a low level signal, the "No_dimmer" signal becomes a high level signal after the low level "No_dimmer" signal is inverted by the inverter 68. Then a logic AND operation is performed on the inverted "No_dimmer" signal and the output terminal (Q) with high level to output a high level, that is, the output control signal (Bleeder_EN) is a high level. Therefore, the bleeder is enabled. On the other hand, the timer 63 receives the narrow pulse signal (Rst) and starts timing based on the clock signal (CLK), the latch 64 latches the timing result (D) output by the timer 63, and the register 65 right shifts the timing result by 1 bit, so that the binary number is divided by two to generate a timing reference (Tref) to the first comparator 66. When the timing result (D) output by the timer 63 is equal to the timing reference (Tref), the RS trigger 67 is reset, and the output terminal (Q) of the RS trigger 67 is at low level. In addition, since the dimmer signal ("No_dimmer" signal) is a low level, the "No_dimmer" signal becomes a high level signal after the low level "No_dimmer" signal is inverted by the inverter 68. Then a logic AND operation is performed on the inverted "No_dimmer" signal and the output terminal (Q) with low level to output a low level, that is, the output control signal (Bleeder_EN) is a low level. Therefore, the bleeder is disabled. In this embodiment, since the register 65 divides the binary number by two, in half of a power frequency cycle, when the sine angle value of the bus voltage signal is between 0 degree and 90 degrees, the bleeder is enabled based on the control signal; and when the sine angle value of the bus voltage signal is between 90 degrees and 180 degrees, the bleeder is disabled based on the control signal.

Figure 17:
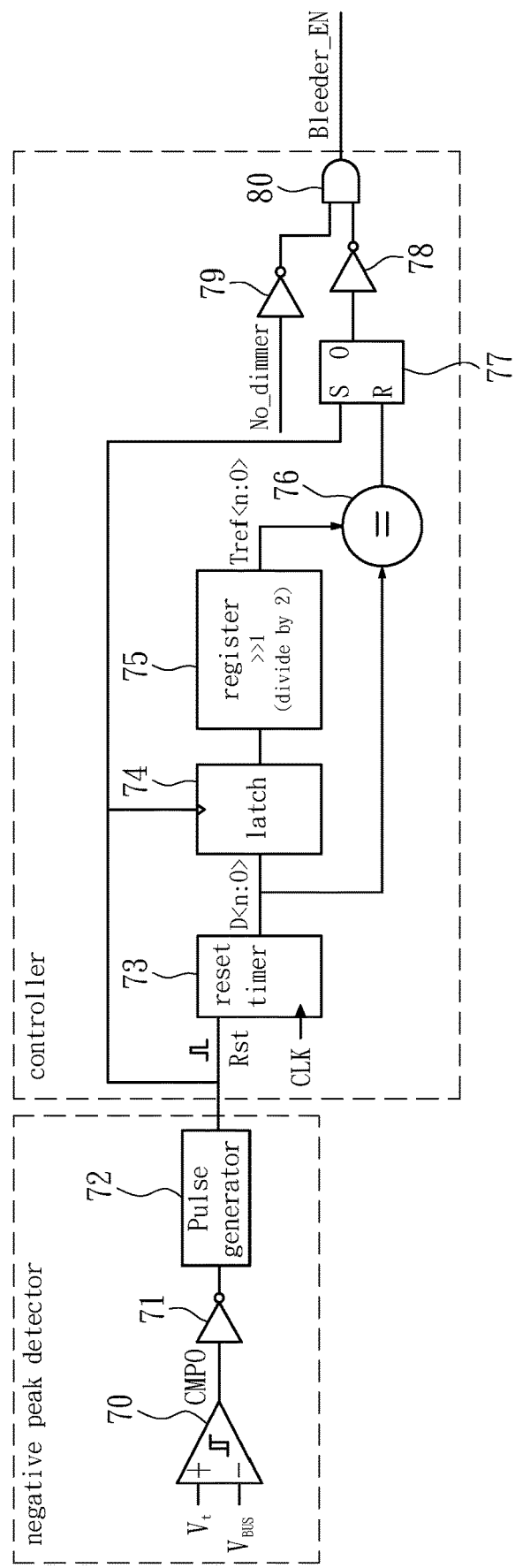
FIG. 17 is a structural schematic diagram of a bleeder control circuit of the present application in still another embodiment.

Please refer to FIG. 17, it is a structural schematic diagram of a bleeder control circuit in another embodiment that the dimmer is a trailing-edge phase dimmer and the dimmer detector is configured to detect existence of the dimmer. As shown in FIG. 17, the bleeder control circuit includes a negative peak detector and a controller. In this embodiment, the first logic circuit in the negative peak detector includes a second comparator 70 and a first inverter 71 and a pulse generator 72. The pulse generator 72 in the negative peak detector outputs a narrow pulse which indicates a negative peak. The controller includes a timer 73, a timing reference generating circuit including a latch 74 and a register 75, a first comparator 76, a reset circuit including a RS trigger 77, and a first logic gate circuit including a second inverter 78, a third inverter 79 and an AND gate 80. In one embodiment, the timer 73 counts continuously and is cleared at each negative peak, and an clock signal (CLK) is generated by an internal oscillator. The latch 74 latches the result of the timer 73 before the timer 73 is cleared at each negative peak, and the output thereof represents the power frequency cycle. The register 75 is a shift register which right shifts the output of the latch 74 by 1 bit, so that the binary number is divided by two, and the output of the register 75 is used as a timing reference. The RS trigger 77 is set at the negative peak, and is reset when the output of the timer 73 is equal to the timing reference. The second inverter 78, the third inverter 79 and the AND gate 80 output a control signal based on the output of the RS trigger 77 and the type of the dimmer, wherein the control signal is output to control the bleeder.

Figure 18:
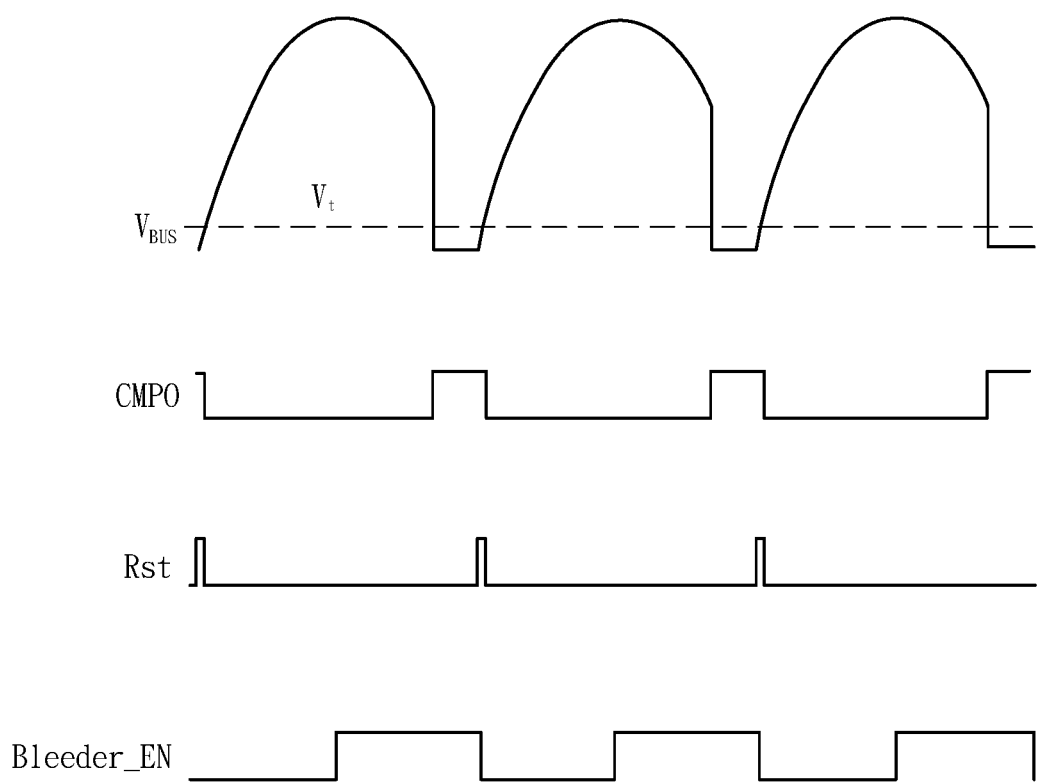
FIG. 18 are waveform schematic diagrams of related electric signals in a bleeder control circuit of the present application.

In addition, FIG. 18 shows waveforms of related electric signals in a bleeder control circuit of the present application. In combination with FIG. 17 and FIG. 18, the second comparator 70 receives an electric signal ($V_t$) indicating reference voltage and an electric signal ($V_{BUS}$) indicating bus voltage. In this embodiment, when the electric signal ($V_{BUS}$) is greater than the electric signal ($V_t$), the output compared result (CMPO) is a low level signal; and when the electric signal ($V_{BUS}$) is smaller than the electric signal ($V_t$), the output compared result (CMPO) is a high level signal. The first inverter 71 receives the compared result (CMPO) and performs an inverting operation. When a negative peak is detected, the pulse generator 72 outputs a narrow pulse signal (Rst) based on the electric signal ($V_{BUS}$) and the electric signal ($V_t$) at a falling edge of the compared result (CMPO), which is also at an rising edge of the result output by the first inverter 71. On one hand, the RS trigger 77 is set based on the narrow pulse signal (Rst), that is, the output terminal (Q) is at high level. An inverting operation is performed on the output terminal (Q) with high level to output a low level. In addition, since the dimmer signal ("No_dimmer" signal) is a low level signal, the "No_dimmer" signal becomes a high level signal after the low level "No_dimmer" signal is inverted by the third inverter 79. Then, a logic AND operation is performed on the inverted "No_dimmer" signal and the low level which is output through the inverting operation to output a low level, that is, the output control signal (Bleeder_EN) is a low level. Therefore, the bleeder is disabled. On the other hand, the timer 73 receives the narrow pulse signal (Rst) and starts timing based on the clock signal (CLK), the latch 74 latches the timing result (D) output by the timer 73, and the register 75 right shifts the timing result (D) by 1 bit, so that the binary number is divided by two to generate a timing reference (Tref) to the first comparator 76. When the timing result (D) output by the timer 73 is equal to the timing reference (Tref), the RS trigger 77 is reset, and the output terminal (Q) of the RS trigger 77 is at low level, and an inverting operation is performed on the output terminal (Q) with low level to output a high level. In addition, since the dimmer signal ("No_dimmer" signal) is a low level signal, the "No_dimmer" signal becomes a high level signal after the low level "No_dimmer" signal is inverted by the inverter 79. Then, a logic AND operation is performed on the inverted "No_dimmer" signal and the high level which is output through the inverting operation to output a high level, that is, the output control signal (Bleeder_EN) is a high level. Therefore, the bleeder is enabled. In this embodiment, since the register 75 divides the binary number by two, in half of a power frequency cycle, when the sine angle value of the bus voltage signal is between 0 degree and 90 degrees, the bleeder is disabled based on the control signal; and when the sine angle value of the bus voltage signal is between 90 degrees and 180 degrees, the bleeder is enabled based on the control signal.

It should be noted that, the above register which right shifts the output of the latch by 1 bit, so that the binary number is divided by two is merely exemplary, and also, the phase interval between 0 degree and 90 degrees and the phase interval between 90 degrees and 180 degrees are merely exemplary, and the present application is not limited hereto. Other registers can be used and different phase interval ranges can be divided by those skilled in the art depending on the requirements, which will not be described herein.

Figure 19:
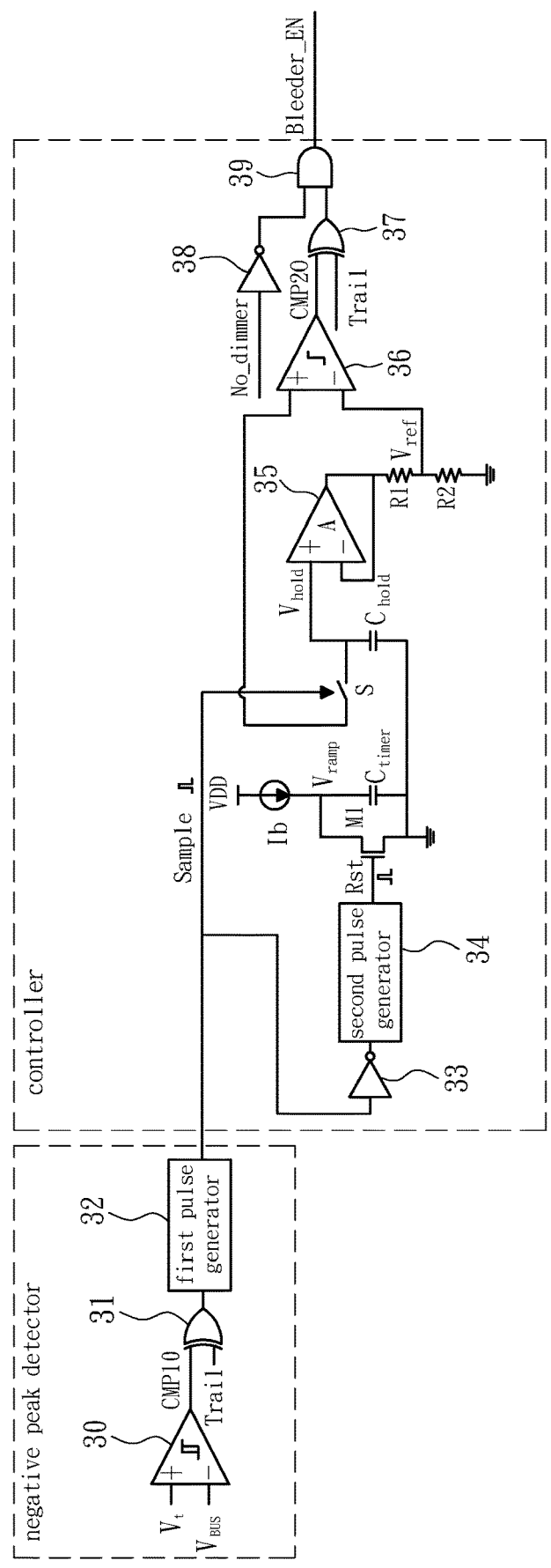
FIG. 19 is a structural schematic diagram of a bleeder control circuit of the present application in another embodiment.

In addition, with regard to the case that an analogue signal is used in the timer and the timing reference generator, please refer to FIG. 19, which is a structural schematic diagram of a bleeder control circuit in another embodiment that the dimmer detector is configured to detect existence and a type of the dimmer. As shown in FIG. 19, the bleeder control circuit includes a negative peak detector and a controller. In this embodiment, the first logic circuit in the negative peak detector includes a second comparator 30, a first XOR gate 31, and a first pulse generator 32. The first pulse generator 32 in the negative peak detector outputs a narrow pulse which indicates a negative peak. The controller includes a first inverter 33, a second pulse generator 34, a timer, a timing reference generating circuit, a voltage divider, a first comparator 36, and a first logic gate circuit. In detail, the timer includes a first capacitor circuit comprising a MOSFET (M1) and a capacitor ($C_{timer}$) as shown in the figure; the timing reference generating circuit includes a second capacitor circuit comprising a capacitor ($C_{hold}$) and a switch device (S) as shown in the figure; the voltage divider includes a buffer 35 and resistors (R1) and (R2) as shown in the figure; and the first logic gate circuit includes a second XOR gate 37, a second inverter 38 and an AND gate 39. In one embodiment, timing is performed through charging-discharging of the capacitor ($C_{timer}$), and the timing result of the capacitor ($C_{timer}$) is latched through the capacitor ($C_{hold}$). The latched timing result is divided through the buffer 35 and the resistor (R1) and the resistor (R2) to generate a timing reference and output to the first comparator 36. The second XOR gate 37 and the AND gate 39 output a control signal based on the output of the first comparator 36 and the type of the dimmer, wherein the control signal is output to control the bleeder can be controlled.

Figure 20A:
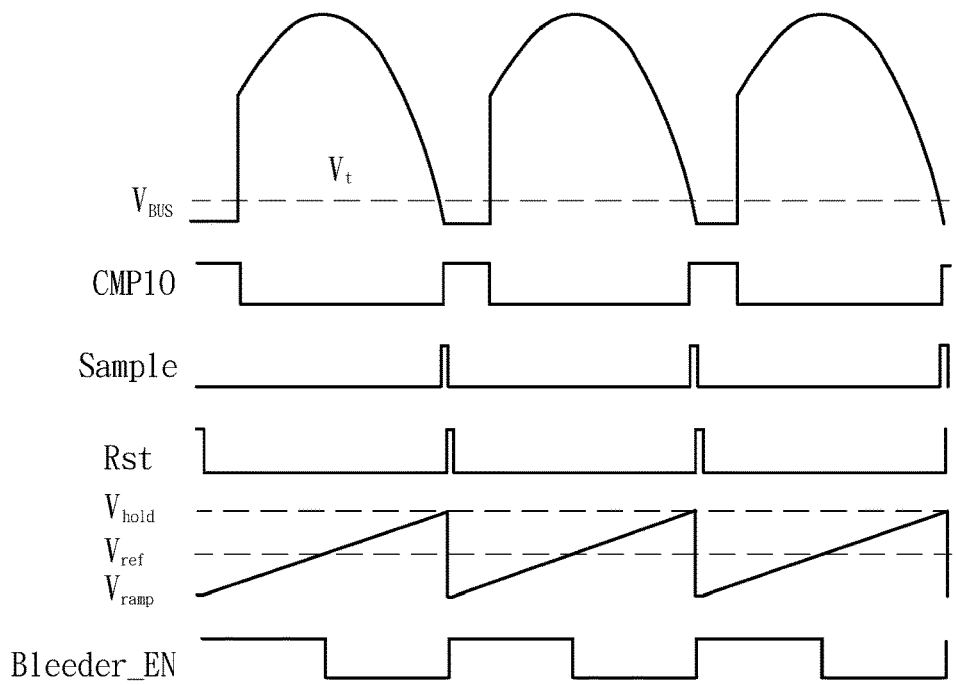
FIG. 20a and FIG. 20b are waveform schematic diagrams of related electric signals in a bleeder control circuit of the present application.
Figure 20B:
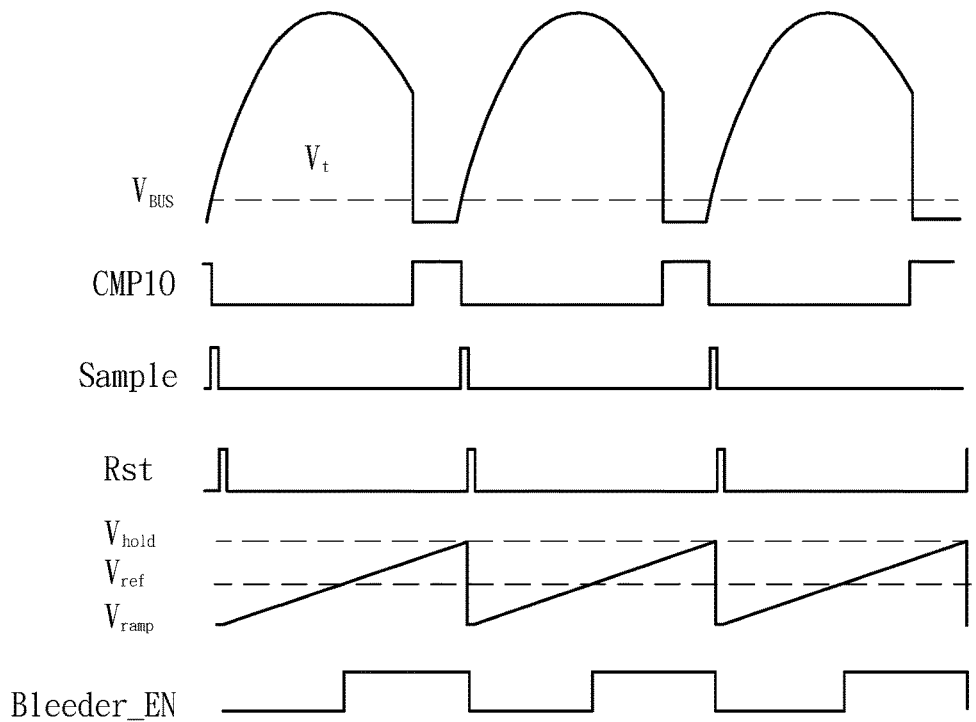

In addition, FIG. 20a and FIG. 20b are waveform schematic diagrams of related electric signals in a bleeder control circuit of the present application. FIG. 20a shows waveforms related electric signals when a leading-edge phase dimmer is connected, and FIG. 20b shows waveforms related electric signals when a trailing-edge phase dimmer is connected. In combination with FIG. 19, FIG. 20a and FIG. 20b, the second comparator 30 receives an electric signal ($V_r$) indicating reference voltage and an electric signal ($V_{BUS}$) indicating bus voltage. In this embodiment, when the electric signal ($V_{BUS}$) is greater than electric signal ($V_r$), the output compared result (CMP1O) is a low level signal; and when the electric signal ($V_{BUS}$) is smaller than electric signal ($V_r$), the output compared result (CMP1O) is a high level signal. The first XOR gate 31 receives the compared results (CMP1O) and a detection signal provided by the dimmer detector and then performs XOR logic operation. The detection signal includes a first signal indicating that a leading-edge phase dimmer is existent, a second signal indicating that a trailing-edge phase dimmer is existent, and a third signal indicating non-existence of the dimmer. Specifically, a "Trail" terminal and a "No_dimmer" terminal receive the detection signal. In the following embodiment, the "Trail" terminal with a low level indicates that a leading-edge phase dimmer is existent, the "Trail" terminal with a high level indicates that a trailing-edge phase dimmer is existent, and the "No_dimmer" terminal with a high level indicates non-existence of the dimmer.

As shown in FIG. 20a, when the detection signal is the first signal which indicates that a leading-edge phase dimmer is existent, namely, the "Trail" terminal is at low level, and the "No_dimmer" terminal is at low level. When a negative peak is detected, the first pulse generator 32 outputs a narrow pulse signal (Sample) at an rising edge of the compared result (CMP1O), which is also at an rising edge of the result output by the first XOR gate 31. On one hand, the narrow pulse signal (Sample) enables the switch device (S) to be closed within a short time period, such that the voltage ($V_{ramp}$) across the capacitor ($C_{timer}$) is equal to the voltage ($V_{hold}$) across the capacitor ($C_{hold}$), and the voltage ($V_{hold}$) is latched after the switch device (S) is open. Then, the capacitor ($C_{timer}$) is discharged, and the voltage ($V_{ramp}$) input to the first comparator 36 is smaller than the voltage ($T_{hold}$), that is, the output terminal of the first comparator 36 which outputs a compared result (CMP2O) is at high level. An XOR operation is performed on the output terminal of the first comparator 36 with high level and the "Trail" terminal with low level to output a high level. In addition, since the dimmer signal ("No_dimmer" signal) is a low level signal, the "No_dimmer" signal becomes a high level signal after the low level "No_dimmer" signal is inverted by the second inverter 38. Then, a logical AND operation is performed on the inverted "No_dimmer" signal and the high level which is output through an XOR operation to output a high level, that is, the output control signal (Bleeder_EN) is a high level. Therefore, the bleeder is enabled. On the other hand, another pulse signal (Rst) is output at a falling edge of the narrow pulse signal (Sample) after the narrow pulse signal (Sample) being processed by the first inverter 33 and the second pulse generator 34. The pulse signal (Rst) enables the MOSFET (M1) to be turned on, and the capacitor ($C_{timer}$) begins to be charged and starts timing. The voltage ($V_{ramp}$) across the capacitor ($C_{timer}$) is as shown by oblique waves in the figure. When the next negative peak is detected, namely, after the next narrow pulse signal (Sample) is output, the capacitor ($C_{timer}$) is discharged instantly and reset. Then, the second pulse generator 34 generates the pulse signal (Rst) based on the inverted narrow pulse signal (Sample) which is inverted by the first inverter 33, and the capacitor ($C_{timer}$) restarts timing based on the pulse signal (Rst). In this embodiment, if the resistance value of the resistor (R1) is set to be equal to the resistance value of the resistor (R2), then the voltage ($V_{ref}$) is equal to ($V_{hold/2}$). According to the voltage ($V_{ramp}$) and the voltage ($V_{ref}$) input to the first comparator 36, the output terminal of the first comparator 36 which outputs the compared result (CMP2O) is at high level when the voltage ($V_{ramp}$) is smaller than the voltage ($V_{ref}$). An XOR operation is performed on the output terminal of the first comparator 36 with high level and the "Trail" terminal with low level to output a high level. In addition, since the dimmer signal ("No_dimmer" signal) is a low level signal, the "No_dimmer" signal becomes a high level signal after the low level "No_dimmer" signal is inverted by the second inverter 38. Then a logic AND operation is performed on the inverted "No_dimmer" signal and the high level which is output through the XOR operation to output a high level, that is, the output control signal (Bleeder_EN) is a high level. Therefore, the bleeder is enabled. When the voltage ($V_{ramp}$) is greater than the voltage ($V_{ref}$), the output terminal of the first comparator 36 which outputs the compared result (CMP2O) is at low level. An XOR operation is performed on the output terminal of the first comparator 36 with low level and the "Trail" terminal with low level to output a low level. In addition, since the dimmer signal ("No_dimmer" signal) is a low level signal, the "No_dimmer" signal becomes a high level signal after the low level "No_dimmer" signal is inverted by the second inverter 38. Then, a logic AND operation is performed on the inverted "No_dimmer" signal and the low level which is output through the XOR operation to output a low level, that is, the output control signal (Bleeder_EN) is a low level, thereby the bleeder is disabled. In this embodiment, since the resistance value of the resistor (R1) is set to be equal to resistance value of the resistor (R2), in half of a power frequency cycle, when the sine angle value of the bus voltage signal is between 0 degree and 90 degrees, the bleeder is enabled based on the control signal; and when the sine angle value of the bus voltage signal is between 90 degrees and 180 degrees, the bleeder is disabled based on the control signal.

When the detection signal is the second signal which indicates that a trailing-edge phase dimmer is existent, that is, the "Trail" terminal is at high level and the "No_dimmer" is at low level, the corresponding waveform diagrams are as shown in FIG. 20b, and the corresponding control circuit logic is similar to the above control circuit, and will not be described in detail herein.

When the detection signal is the third signal which indicates non-existence of the dimmer, the "No_dimmer" signal is a high level signal, and the "No_dimmer" signal becomes a low level signal after the high level "No_dimmer" signal is inverted by the second inverter 38. A low level signal can be output when a logic AND operation is performed on the inverted "No_dimmer" signal and the signal in any level, that is, the output control signal (Bleeder_EN) is a low level, thereby the bleeder is disabled. Therefore, when the detection signal indicates non-existence of the dimmer, the bleeder is disabled based on the control signal.

It should be noted that, the above resistances values of the resistor (R1) and the resistor (R2) are merely exemplary, and also, the phase interval between 0 degree and 90 degrees and the phase interval between 90 degrees and 180 degrees are merely exemplary, and the present application is not limited hereto. Different resistance values can be used and different phase interval ranges can be divided by those skilled in the art depending on the requirements, which will not be described herein.

In addition, the implementation manners in which the dimmer is a leading-edge phase dimmer and the dimmer detector is configured to detect existence of the dimmer, as well as the dimmer is a trailing-edge phase dimmer and the dimmer detector is configured to detect existence of the dimmer are similar as the implementation manner mentioned above, and will not be described herein.

It should be noted that, those skilled in the art should understand that the electric signal accessed into a positive input terminal and a negative input terminal of a comparator can be interchanged according to actual design of a circuit, namely, an electric signal ($V_{BUS}$) indicating bus voltage is accessed to a positive input terminal of the comparator, while an electric signal ($V_r$) indicating reference voltage is accessed to a negative input terminal of the comparator, and the corresponding control circuit logics and waveforms of related electric signals will not be described in detail herein. In addition, the above setting of a high level and a low level at the "Trail" terminal are merely exemplary, and the present application is not limited hereto. For example, the "Trail" terminal at a low level indicates that a trailing-edge phase dimmer is existent, and the Trail terminal at a high level indicates that a leading-edge phase dimmer is existent can be set, and these will not be described herein.

The present application further provides a chip. The chip is used in a device which requires a bleeder, such as an LED lighting equipment, a switching power supply etc. The chip is used to generate a control signal of a bleeder according to a detection signal which indicates existence and a type of the dimmer, and to control the bleeder to be in normal operation state within a given phase interval based on the control signal. The chip includes an input terminal and an output terminal, wherein the iput terminal is coupled to a dimmer detector arranged on a power supply bus, and the output terminal is coupled to a bleeder arranged on the power supply bus. The chip controls the bleeder to perform corresponding operating state based on the control signal output by the output terminal. The ways in which the chip generates a control signal based on a detection signal is as shown in FIG. 2~20 and related descriptions, and will not be described herein.

Figure 21:
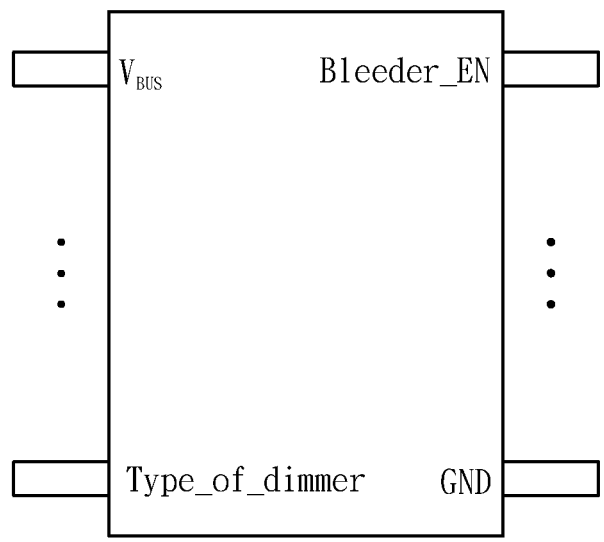
FIG. 21 is a structural schematic diagram of chip package of the present application in one embodiment.

Please refer to FIG. 21, which is a structural schematic diagram of chip package in one embodiment of the present application. As shown in the FIG. 21, the chip includes multiple pins. The pins include a first pin configured to collect a voltage signal ($V_{BUS}$) on a power supply bus, a second pin (GND) configured to be grounded, a third pin configured to receive a detection signal (Type_of_dimmer), and a fourth pin configured to output a control signal (Bleeder_EN). In one embodiment, the first pin is coupled to a bus to acquire an electric signal indicating the bus voltage directly; and in other embodiment, the first pin acquires an electric signal indicating the bus voltage through other manners known by those skilled in the art. For example, the first pin acquires an electric signal indicating the bus voltage through a divided resistor. In addition, when a constant voltage power source in the bleeder control circuit is an external power source, the chip further includes a pin (VDD) configured to be coupled to the constant voltage power source. The first pin is accessed to a corresponding output terminal in the rectifier based on the recitations as shown in FIG. 2~20 and related descriptions. For example, the first pin is coupled to an output terminal of the rectifying circuit and acquires a voltage signal reflecting change of a power supply bus voltage. The bleeder control circuit is coupled to an output terminal of the dimmer detector via the third pin. The bleeder control circuit is coupled to a control terminal or an input terminal of the bleeder via the fourth pin.

In some embodiments, the bleeder control circuit is integrated into a chip together with a dimmer detector. The dimmer detector is a circuit configured to detect existence and a type of the dimming device, and output a detection signal. For example, the dimmer detector is a circuit provided in the US Patent Publication No. US20190150240A1, which is incorporated by reference herein. In some other embodiments, the bleeder control circuit is integrated into a chip together with a dimmer detector and a bleeder. The bleeder is a circuit configured to perform a corresponding operating state based on a control signal output by the control circuit. The bleeder is a circuit provided in the Chinese Patent Application No. CN103841725B, which is incorporated by reference herein. Accordingly, the chip includes other pins related to the dimmer detector and the bleeder.

Figure 22:
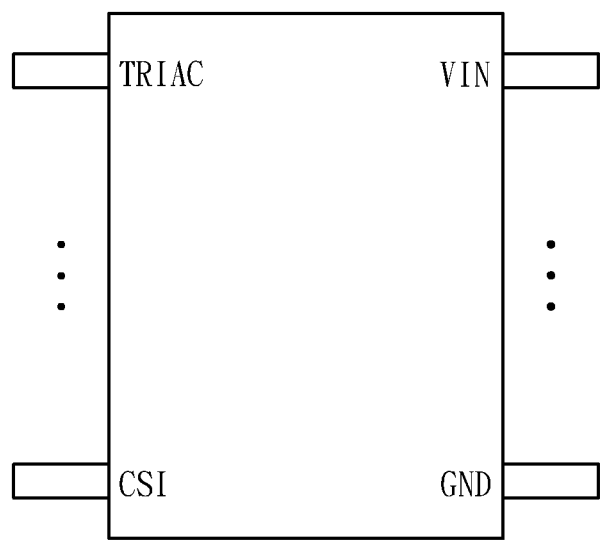
FIG. 22 is a structural schematic diagram of chip package of the present application in another embodiment.

In a case that the chip is integrated with a dimmer detector, a bleeder control circuit and a bleeder, please refer to FIG. 22 which is a structural schematic diagram of chip package in another embodiment of the present application. As shown in FIG. 22, the chip includes multiple spins. The pins include a first pin (TRIAC), a second pin (VIN), a third pin (CS1), and a forth pin (GND), etc. When the system is powered on, the second pin (VIN) supplies power to the chip via an external high-voltage junction gate field-effect transistor (JFET). The chip detects the input which indicates existence and a type of the dimmer via the first pin (TRIAC), and the chip controls a bleeder current based on the detection result, wherein the bleeder current is set through resistance value of the third pin (CS1).

It should be noted that, the above package structure of the chip is merely exemplary, and the present application is not limited hereto. Those skilled in the art can design any chip package structure depending on the requirements, and will not be described herein.

Figure 23:
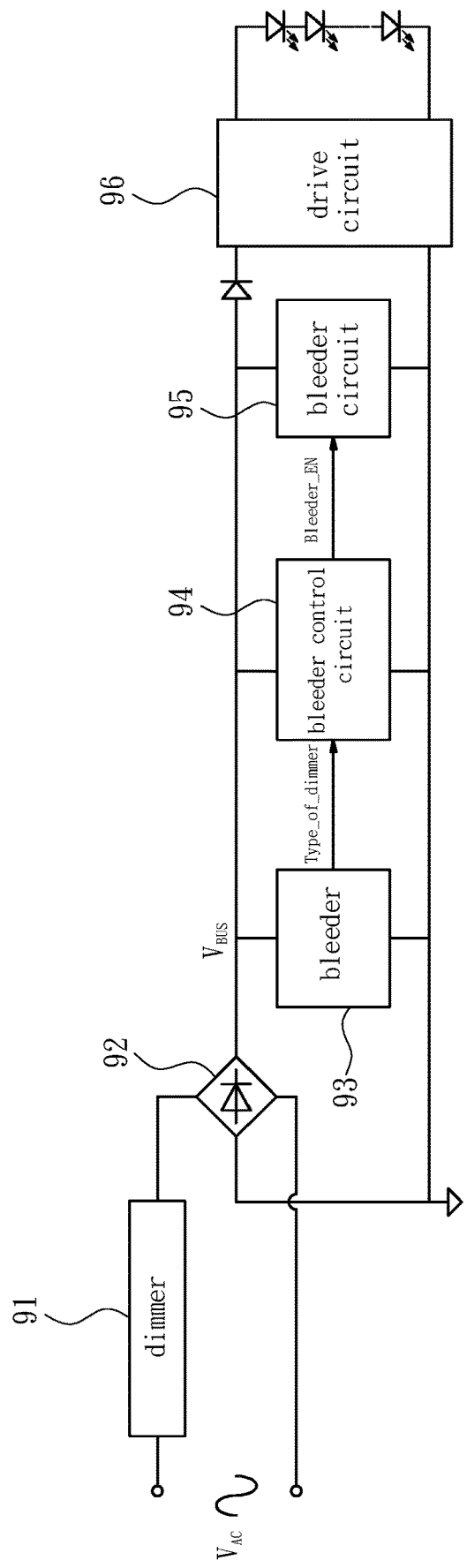
FIG. 23 is a structural schematic diagram of a driver system of the present application in one embodiment.

The present application further provides a driver system which is arranged in a driver system of LED lighting equipment or fluorescent lamp lighting equipment. A dimmer detector and a bleeder control circuit in the driver system can be packaged in a chip; or a dimmer detector, a bleeder control circuit and a bleeder in the driver system can be packaged in a chip; or a rectifier, a dimmer detector, a control circuit, a bleeder and a drive circuit of the driver system can be integrated onto a PCB. Please refer to FIG. 23, which is a structural schematic diagram of a driver system in one embodiment of the present application. As shown in FIG. 23, the driver system includes a rectifier 92, a dimmer detector 93, a bleeder control circuit 94, a bleeder 95 and a drive circuit 96. A dimmer 91 is coupled to an external AC, the rectifier 92 is coupled to the dimmer 91, the dimmer detector 93 is coupled to the rectifier 92 to receive an electric signal ($V_{BUS}$) indicating the bus voltage, the bleeder control circuit 94 is coupled to the dimmer detector 93 and the bleeder 95, and the drive circuit 96 is configured to drive a load. In some embodiments, the rectifier 92 rectifies the voltage input by an external AC and outputs the rectified voltage to the load. The dimmer detector 93 receives an electric signal indicating the bus voltage and detects existence and a type of the dimmer and outputs a detection signal (Type_of_dimmer). The ways in which the bleeder control circuit 94 generates a control signal based on the detection signal output by the dimmer detector 93 is as shown in FIG. 2~20 and related descriptions, and will not be described herein. The bleeder 95 performs corresponding operating state when receiving the control signal (Bleeder_EN) output by the bleeder control circuit 94.

Figure 24:
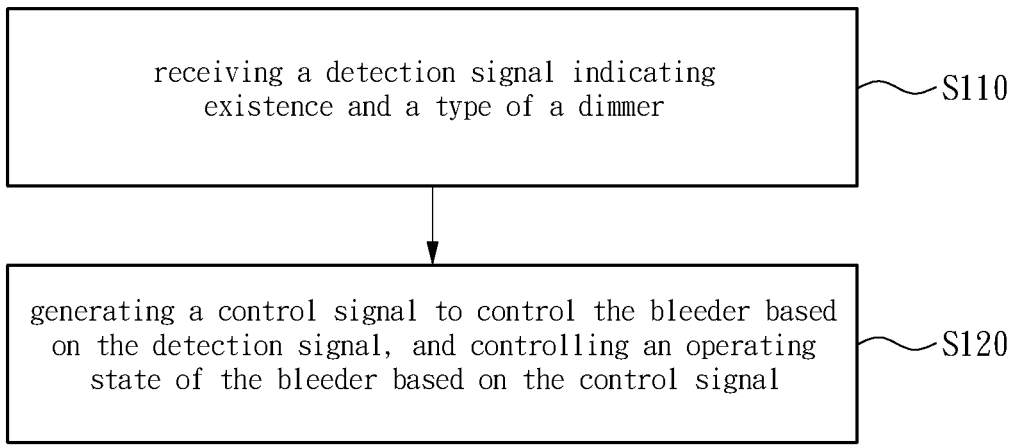
FIG. 24 is a flow chart of a control method of a bleeder of the present application in one embodiment.

The present application further provides a method for controlling a bleeder, and the method is performed by the bleeder control circuit mentioned above. Please refer to FIG. 24, which is a flow chart of a control method of a bleeder in one embodiment of the present application. As shown in FIG. 24, the control method of the bleeder includes step S110 and step S120.

In step S110, a detection signal which indicates existence and a type of the dimming device is received.

The detection signal which indicates existence and the type of the dimming device is generated by a dimmer detector. The dimming device can be a dimmer, and is usually arranged between an AC input power and a rectifier bridge. The dimmer is an electric device configured to change luminous flux of a light source in lighting equipment (a load) and regulate an luminance levels. In some embodiments, the dimmer can be a leading-edge phase dimmer or a trailing-edge phase dimmer. Further, regarding the implementation of the dimmer detector, please refer to the dimmer detector described in the US Patent Publication No. US 2019150240A1. The dimmer detector detects existence and detects whether the dimmer is a leading-edge phase dimmer or a trailing-edge phase dimmer if the dimmer is existent, and the dimmer detector outputs a detection signal based on the detection result.

In step S120, a control signal of the bleeder is generated based on the detection signal, and an operating state of the bleeder is controlled based on the control signal.

The above steps are performed through a bleeder control circuit. The bleeder control circuit 22 generates a control signal of the bleeder 23 based on the detection signal which indicates whether a dimmer is existent and the type of the dimmer, so as to control the operating state of the bleeder 23. Please refer to FIG. 3, which is a flow chart for the bleeder control circuit controlling the operating state of the bleeder based on a detection signal. As shown in FIG. 3, if the detection signal indicates non-existence of the dimmer, the bleeder control circuit generates a control signal which indicates that the bleeder is disabled, so as to disable the bleeder. If the detection signal indicates that a dimmer is existent and the dimmer is a leading-edge phase dimmer, the bleeder control circuit generates a control signal to enable the bleeder in a phase interval of 0 degree and a first degree, and to disable the bleeder in a phase interval of the first degree and 180 degrees, so as to enable the bleeder when the sine angle value of the bus voltage signal is between 0 degree and the first degree, and to disable the bleeder when the sine angle value of the bus voltage signal is between the first degree and 180 degrees. In one embodiment, the first degree is 90 degrees. If the detection signal indicates that a dimmer is existent and the dimmer is not a leading-edge phase dimmer, that is to say, when the dimmer is a trailing-edge phase dimmer, the bleeder control circuit generates a control signal to disable the bleeder in a phase interval of 0 degree and a second degree, and to enable the bleeder in a phase interval of the second degree and 180 degrees, so as to disable the bleeder when the sine angle value of the bus voltage signal is between 0 degree and the second degree, and enable the bleeder when the sine angle value of the bus voltage signal is between the second degree and 180 degrees. In one embodiment, the second degree is 90 degrees. The bus refers to a power supply transmission line for transmitting the input AC power source which is rectified to a load.

It should be noted that, the ranges of the phase interval as mentioned above are merely exemplary, and the present application is not limited hereto. A proper range of phase interval can be selected by those skilled in the art depending on actual requirements, and will not be described herein.

Accordingly, the bleeder control circuit of the present application generates a control signal of a bleeder based on a detection signal which indicates existence and a type of the dimmer to control the operate state of the bleeder within a given phase interval, thereby reducing the power consumption of the bleeder while ensuring steady operation of the dimmer or the dimming device.

Figure 25:
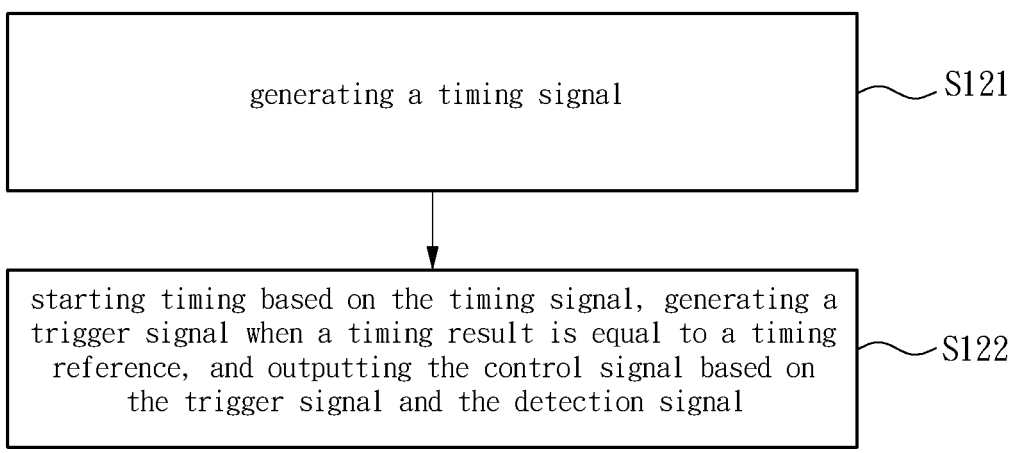
FIG. 25 is a flow chart of step S120 in a control method of a bleeder of the present application in one embodiment.

In some embodiments, please refer to FIG. 25, which is a flow chart of step S120 in a control method of a bleeder in one embodiment of the present application. As shown in FIG. 25, the step S120 includes step S121 and step S122.

In step S121, a timing signal is generated.

The timing signal is generated by a negative peak detector. Please refer to FIG. 4, which is a structural schematic diagram of a bleeder control circuit in another embodiment of the present application. As shown in FIG. 4, a bleeder control circuit includes a negative peak detector 41 and a controller 42, wherein the negative peak detector 41 is coupled to a dimmer detector 43, and the controller 42 is coupled to the negative peak detector 41 and the dimmer detector 43. In addition, the dimmer detector 43 is the same as or similar to the above dimmer detector, and will not be described herein.

In some embodiments, the negative peak detector 41 receives an electric signal indicating the bus voltage and a detection signal output by the dimmer detector 43 to generate a timing signal. In one embodiment, the negative peak detector 41 is coupled to a bus to acquire the electric signal indicating bus voltage directly. In another embodiment, the negative peak detector 41 acquires the electric signal indicating the bus voltage through other manners known by those skilled in the art. For example, the negative peak detector acquires the electric signal indicating bus voltage through a divided resistor.

In some embodiments, the step of generating a timing signal comprises outputting an executive signal based on the received electric signal indicating the bus voltage and the detection signal; and outputting the timing signal based on the executive signal. The above steps are performed by a first logic circuit and a pulse generator respectively.

Please refer to FIG. 5, which is a structural schematic diagram of a negative peak detector in a bleeder control circuit in one embodiment of the present application. As shown in FIG. 5, the negative peak detector includes a first logic circuit 411 and a pulse generator 412, wherein the first logic circuit 411 is coupled to a dimmer detector and the pulse generator 412. The first logic circuit 411 generates an executive signal based on the electric signal and a detection signal output by the dimmer detector. The pulse generator 412 outputs a timing signal based on the executive signal generated by the first logic circuit. In the present application, the executive signal is represented by a high level and a low level which will be described below.

Please refer to FIG. 6, it is a structural schematic diagram of a negative peak detector in a bleeder control circuit in one embodiment, which is under the condition that the dimmer detector is configured to detect existent and a type of the dimmer. As shown in FIG. 6, the negative peak detector includes a first logic circuit and a pulse generator 413, wherein the first logic circuit includes a comparison circuit 4111 and a logic gate circuit 4112. The logic gate circuit 4112 is coupled to the comparison circuit 4111 and a dimmer detector and the pulse generator 413.

In some embodiments, the comparison circuit 4111 receives an electric signal indicating the bus voltage and compares the electric signal indicating the bus voltage with a preset baseline voltage to output a comparison signal. The logic gate circuit 4112 performs a logic operation on the received comparison signal output by the comparison circuit 4111 with the detection signal output by the dimmer detector, and outputs a executive signal. The pulse generator 413 outputs a timing signal based on the executive signal generated by the logic gate circuit 4112.

However, in actual implementations, the type of a dimmer (for example, a leading-edge phase dimmer or a trailing-edge phase dimmer) may be known in advance, so the dimmer detector only needs to detect existence of the dimmer. Please refer to FIG. 7, it is a structural schematic diagram of a negative peak detector in a bleeder control circuit in another embodiment that the dimmer is known as a leading-edge phase dimmer and the dimmer detector is configured to detect existence of the dimmer. As shown in FIG. 7, the negative peak detector includes a first logic circuit and a pulse generator 414, wherein the first logic circuit includes a comparison circuit 4113 coupled to the pulse generator 414. In some embodiments, the comparison circuit 4113 receives an electric signal indicating the bus voltage, and compares the electric signal indicating the bus voltage with a preset baseline voltage to output a comparison signal. The pulse generator 414 outputs a timing signal based on the comparison signal generated by the comparison circuit 4113.

Please refer to FIG. 8, it is a structural schematic diagram of a negative peak detector in a bleeder control circuit in another embodiment that the dimmer is known as a trailing-edge phase dimmer and the dimmer detector is configured to detect existence of the dimmer. As shown in FIG. 8, the negative peak detector includes a first logic circuit and a pulse generator 416, wherein the first logic circuit includes a comparison circuit 4114 and an inverting circuit 4115 coupled to the comparison circuit 4114 and the pulse generator 416. In some embodiments, the comparison circuit 4114 receives an electric signal indicating bus voltage, and compares the electric signal indicating bus voltage with a preset baseline voltage to output a compared signal. The inverting circuit 4115 performs an inverting processing on the comparison signal output by the comparison circuit 4114 to output a executive signal. The pulse generator 416 outputs a timing signal based on the executive signal generated by the inverting circuit 4115.

In step S122, timing is started based on the timing signal, and a trigger signal is generated when the timing result is equal to a timing reference, and a control signal is output based on the trigger signal and the detection signal.

The above step is performed by a controller. The controller starts timing based on the timing signal, generates a trigger signal when a timing result is equal to a timing reference, and outputs a control signal based on the trigger signal and the detection signal. The timing is performed by a timer. In some embodiments, the timer includes a first capacitor circuit, and the timing is performed through charging-discharging of the capacitor in the first capacitor circuit. The timing reference is set in advance, for example, the timing reference is preset to be a digital signal or an analogue signal depending on the requirements. In some embodiments, the timing reference is preset as an analogue signal which are acquired through a reference voltage source; or the timing reference is preset as a digital signal with high or low levels; or the timing reference is preset as a digital signal or an analogue signal which is calculated based on a measurement of a power frequency cycle, so as to be appropriate for grid standards of different countries.

Please refer to FIG. 9, which is a structural schematic diagram of a controller in a bleeder control circuit in one embodiment of the present application. As shown in FIG. 9, the controller includes a timer 421, a first comparator 422, a reset circuit 423 and a first logic gate circuit 424. The timer 421 is coupled to a negative peak detector, the first comparator 422 is coupled to the timer 421, the reset circuit 423 is coupled to the first comparator 422 and the negative peak detector, and the first logic gate circuit 424 is coupled to the reset circuit 423 and a dimmer detector. In some embodiments, the timer 421 receives a timing signal output by the negative peak detector and starts timing based on a clock signal. The first comparator 422 compares a timing result output by the timer 421 with a predetermined timing reference and outputs a reset signal when the timing is equal to the timing reference. The reset circuit 423 generates a trigger signal based on the timing signal when the reset circuit 423 receives the reset signal output by the first comparator 422. The first logic gate circuit 424 outputs a control signal based on the detection signal when the first logic gate circuit 424 receives the trigger signal.

Please refer to FIG. 10, it is a structural schematic diagram of a controller in a bleeder control circuit in another embodiment, which is under the condition that the timing reference is calculated based on a measurement of a power frequency cycle. As shown in FIG. 10, the controller includes a timer 425, a timing reference generator 429, a first comparator 426, a reset circuit 427 and a first logic gate circuit 428. The timer 425 is coupled to a negative peak detector, the timing reference generator 429 is coupled to the negative peak detector and the timer 425, the first comparator 426 is coupled to the timer 425 and the timing reference generator 429, the reset circuit 427 is coupled to the first comparator 426 and the negative peak detector, and the first logic gate circuit 428 is coupled to the reset circuit 427 and a dimmer detector. In some embodiments, the timer 425 receives a timing signal output by the negative peak detector and starts timing based on a clock signal. The timing reference generator 429 generates a timing reference based on the clock signal and the timing signal output by the negative peak detector. The first comparator 426 compares a timing result output by the timer 425 with the timing reference output by the timing reference generator 429, and outputs a reset signal when the timing result is equal to the timing reference. The reset circuit 427 generates a trigger signal based on the timing signal when the reset circuit 427 receives the reset signal output by the first comparator 426. The first logic gate circuit 428 outputs a control signal based on the detection signal when the first logic gate circuit 428 receives the trigger signal.

When the timing reference is a digital signal, please refer to FIG. 11, which is a structural schematic diagram of a timing reference generator in a bleeder control circuit in one embodiment of the present application. As shown in FIG. 11, the timing reference generator includes a latch 81 and a register 82. The latch 81 is coupled to the timer and the register 82. In one embodiment, the latch 81 latches a timing result of the timer, then the register 82 shifts and registers the latched timing result, and then calculates to generate a timing reference.

When the timing reference is an analogue signal, the timer includes a first capacitor circuit, and the timer records time through charging-discharging of a first capacitor. Please refer to FIG. 12, which is a structural schematic diagram of a timing reference generator in a bleeder control circuit in another embodiment of the present application. As shown in FIG. 12, the timing reference generator includes a second capacitor circuit 85 and a voltage divider 86. The second capacitor circuit 85 is coupled to the first capacitor circuit and the voltage divider 86. In one embodiment, the second capacitor circuit 85 latches the timing result from the first capacitor circuit, then the voltage divider 86 divides the latched timing result to generate a timing reference.

Specifically, in order to describe clearly, a bleeder control circuit including a negative peak detector and a controller is taken as an example in the following contents. The negative peak detector includes a first logic circuit and a pulse generator, and the controller includes a timer, a timing reference generator, a first comparator, a reset circuit and a first logic gate circuit. The timing reference generator includes a latch and a register. However, the present application is not limited hereto, and variations and modifications can be made by those skilled in the art without departing from the scope recited in the present application.

Please refer to FIG. 13, it is a structural schematic diagram of a bleeder control circuit in one embodiment that the dimmer detector is configured to detect existence and a type of the dimmer. As shown in FIG. 13, the bleeder control circuit includes a negative peak detector and a controller. In this embodiment, the first logic circuit in the negative peak detector includes a second comparator 50 and a first exclusive-OR gate (XOR gate) 51, and the pulse generator in the negative peak detector is a pulse generator 52. The pulse generator 52 in the negative peak detector outputs a narrow pulse which indicates a negative peak. The controller includes a timer 53, a timing reference generator including a latch 54 and a register 55, a first comparator 56, a reset circuit including a RS trigger 57, and a first logic gate circuit including a second XOR gate 59, an inverter 58 and an AND gate 60. In one embodiment, the timer 53 counts continuously and is cleared at each negative peak, and an clock signal (CLK) is generated by an internal oscillator. The latch 54 latches the result of the timer 53 before the timer 53 is cleared at each negative peak, and the output of the latch 54 represents the power frequency cycle. The register 55 is a shift register which right shifts the output of the latch 54 by 1 bit, so that the binary number is divided by two, and the output of the register 55 is used as a timing reference. The RS trigger 57 is set at the negative peak, and is reset when the output of the timer 53 is equal to the timing reference. The second XOR gate 59 and the AND gate 60 output a control signal based on the output of the RS trigger 57 and the type of the dimmer, wherein the control signal is output to control the bleeder.

In addition, FIG. 14a and FIG. 14b are waveform schematic diagrams of related electric signals in a bleeder control circuit of the present application. FIG. 14a shows the waveforms of related electric signals when a leading-edge phase dimmer is connected, and FIG. 14b show the waveforms of related electric signals when a trailing-edge phase dimmer is connected. In combination with FIG. 13, FIG. 14a and FIG. 14b, the second comparator 50 receives an electric signal ($V_r$) indicating reference voltage and an electric signal ($V_{BUS}$) indicating bus voltage. In this embodiment, when the electric signal ($V_{BUS}$) is greater than the electric signal ($V_r$), the output compared result (CMPO) is a low level signal; and when the electric signal ($V_{BUS}$) is smaller than the electric signal ($V_r$), the output compared result (CMPO) is a high level signal. The first XOR gate 51 receives the compared result (CMPO) and a detection signal provided by the dimmer detector and then performs XOR logic operation. The detection signal includes a first signal indicating that a leading-edge phase dimmer is existent, a second signal indicating that a trailing-edge phase dimmer is existent, and a third signal indicating non-existence of the dimmer. Specifically, a "Trail" terminal and a "No_dimmer" terminal receive the detection signal. In the following embodiment, the "Trail" terminal with a low level indicates that a leading-edge phase dimmer is existent, the "Trail" terminal with a high level indicates that a trailing-edge phase dimmer is existent, and the "No_dimmer" terminal with a high level indicates non-existence of the dimmer.

As shown in FIG. 14a, the detection signal is the first signal which indicates that a leading-edge phase dimmer is existent, namely, the "Trail" terminal is at low level, and the "No_dimmer" terminal is at low level. When a negative peak is detected, the pulse generator 52 outputs a narrow pulse signal (Rst) based on the electric signal ($V_{BUS}$) and the electric signal ($V_r$) at an rising edge of the compared result (CMPO), which is also at an rising edge of the result output by the first XOR gate 51. On one hand, the RS trigger 57 is set based on the narrow pulse signal (Rst), that is, the output terminal (Q) is at high level. An XOR operation is performed on the output terminal (Q) with high level and the "Trail" terminal with low level to output a high level. In addition, since the dimmer signal ("No_dimmer" signal) is a low level, the "No_dimmer" signal becomes a high level signal after the low level "No_dimmer" signal is inverted by the inverter 58. Then, a logic AND operation is performed on the inverted "No_dimmer" signal and the high level which is output through the XOR operation to output a high level, that is, the output control signal (Bleeder_EN) is a high level. Therefore, the bleeder is enabled. On the other hand, the timer 53 receives the narrow pulse signal (Rst) and starts timing based on the clock signal (CLK), the latch 54 latches the timing result (D) output by the timer 53, and the register 55 right shifts the timing result (D) by 1 bit, so that the binary number is divided by two to generate a timing reference (Tref) to the first comparator 56. When the timing result (D) output by the timer 53 is equal to the timing reference (Tref), the RS trigger 57 is reset, and the output terminal (Q) of the RS trigger 57 is at low level, and an XOR operation is performed on the output terminal (Q) with low level and the "Trail" terminal with low level to output a low level. In addition, since the dimmer signal ("No_dimmer" signal) is a low level signal, the "No_dimmer" signal becomes a high level signal after the low level "No_dimmer" signal is inverted by the inverter 58. Then a logic AND operation is performed on the inverted "No_dimmer" signal and the low level which is output through the XOR operation to output a low level, that is, the output control signal (Bleeder_EN) is a low level. Therefore, the bleeder is disabled. In this embodiment, since the register 55 divides the binary number by two, in half of a power frequency cycle, when the sine angle value of the bus voltage signal is between 0 degree and 90 degrees, the bleeder is enabled based on the control signal; and when the sine angle value of the bus voltage signal is between 90 degrees and 180 degrees, the bleeder is diabled based on the control signal.

As shown in FIG. 14b, the detection signal is the second signal which indicates that a trailing-edge phase dimmer is existent, namely, the "Trail" terminal is at high level, and the "No_dimmer" terminal is at low level, when a negative peak is detected, the pulse generator 52 outputs a narrow pulse signal (Rst) based on the electric signal ($V_{BUS}$) and the electric signal ($V_r$) at a falling edge of the compared result (CMPO), which is also at an rising edge of the result output by the first XOR gate 51. On one hand, the RS trigger 57 is set based on the narrow pulse signal (Rst), that is, the output terminal (Q) is at high level. An XOR operation is performed on the output terminal (Q) with high level and the "Trail" terminal with high level to output a low level. In addition, since the dimmer signal ("No_dimmer" signal) is a low level signal, the "No_dimmer" signal becomes a high level signal after the low level "No_dimmer" signal is inverted by the inverter 58. Then a logic AND operation is performed on the inverted "No_dimmer" signal and the low level which is output through the XOR operation to output a low level, that is, the output control signal (Bleeder_EN) is a low level. Therefore, the bleeder is disabled. On the other hand, the timer 53 receives the narrow pulse signal (Rst) and starts timing based on the clock signal (CLK), the latch 54 latches the timing result (D) output by the timer 53, and the register 55 right shifts the timing result (D) by 1 bit, so that the binary number is divided by two to generate a timing reference (Tref) at the first comparator 56. When the timing result (D) output by the timer 53 is equal to the timing reference (Tref), the RS trigger 57 is reset, the output terminal (Q) of the RS trigger 57 is at low level, and an XOR operation is performed on the output terminal (Q) with low level and the "Trail" terminal with high level to output a high level. In addition, since the dimmer signal ("No_dimmer" signal) is a low level signal, the "No_dimmer" signal becomes a high level signal after the low level "No_dimmer" signal is inverted by the inverter 58. Then a logic AND operation is performed on the inverted "No_dimmer" signal and the high level which is output through the XOR operation to output a high level, that is, the output control signal (Bleeder_EN) is a high level, thereby the bleeder is enabled. In this embodiment, since the register 55 divides the binary number by two, in half of a power frequency cycle, when the sine angle value of the bus voltage signal is between 0 degree and 90 degrees, the bleeder is diabled based on the control signal; and when the sine angle value of the bus voltage signal is between 90 degrees and 180 degrees, the bleeder is enabled based on the control signal.

When the detection signal is the third signal which indicates non-existence of the dimmer, the signal at "No_dimmer" terminal is at high level, and the "No_dimmer" signal becomes a low level signal after the high level signal at "No_dimmer" terminal is inverted by the inverter 58. Then, a low level is output when a logic AND operation is performed on the inverted "No_dimmer" signal and any level, that is, the output control signal (Bleeder_EN) is a low level and the bleeder is disabled. Therefore, when the detection signal indicates non-existence of the dimmer, the bleeder is disabled based on the control signal.

It should be noted that, those skilled in the art should understand that the electric signal accessed into a positive input terminal and a negative input terminal of a comparator can be interchanged according to actual design of a circuit, namely, an electric signal ($V_{BUS}$) indicating bus voltage is accessed to a positive input terminal of the comparator, while an electric signal ($V_r$) indicating reference voltage is accessed to a negative input terminal of the comparator, and the corresponding control circuit logics and waveforms of related electric signals will not be described in detail herein. In addition, the above setting of a high level and a low level at the "Trail" terminal are merely exemplary, and the present application is not limited hereto. For example, the "Trail" terminal at a low level indicates that a trailing-edge phase dimmer is existent, and the "Trail" terminal at a high level indicates that a leading-edge phase dimmer is existent, and these will not be described herein.

Please refer to FIG. 15, it is a structural schematic diagram of a bleeder control circuit in another embodiment that the dimmer is a leading-edge phase dimmer and the dimmer detector is configured to detect existence of the dimmer. As shown in FIG. 15, the bleeder control circuit includes a negative peak detector and a controller. In this embodiment, the first logic circuit in the negative peak detector includes a second comparator 61 and a pulse generator 62. The pulse generator 62 in the negative peak detector outputs a narrow pulse which indicates a negative peak. The controller includes a timer 63, a timing reference generating circuit including a latch 64 and a register 65, a first comparator 66, a reset circuit including a RS trigger 67, and a first logic gate circuit including an inverter 68 and an AND gate 69. In one embodiment, the timer 63 counts continuously and is cleared at each negative peak, and an clock signal (CLK) is generated by an internal oscillator. The latch 64 latches the result of the timer 63 before the timer 63 is cleared at each negative peak, and the output of the latch 64 represents the power frequency cycle. The register 65 is a shift register which right shifts the output of the latch 64 by 1 bit so that the binary number is divided by two, and the output of the register 65 is used as a timing reference. The RS trigger 67 is set at the negative peak, and at the first comparator 66, the RS trigger 67 is reset when the output of the timer 63 is equal to the timing reference. The AND gate 69 outputs a control signal based on the output of the RS trigger 67 and the type of the dimmer, wherein the control signal is output to control the bleeder.

In addition, FIG. 16 shows waveforms of related electric signals in a bleeder control circuit of the present application. In combination with FIG. 15 and FIG. 16, the second comparator 61 receives an electric signal ($V_t$) indicating reference voltage and an electric signal ($V_{BUS}$) indicating bus voltage. In this embodiment, when the electric signal ($V_{BUS}$) is greater than the electric signal ($V_t$), the output compared result (CMPO) is a low level signal; and when the electric signal ($V_{BUS}$) is smaller than the electric signal ($V_t$), the output compared result (CMPO) is a high level signal. When a negative peak is detected, the pulse generator 62 outputs a narrow pulse signal (Rst) based on the electric signal ($V_{BUS}$) and the electric signal ($V_t$) at an rising edge of the compared result (CMPO). On one hand, the RS trigger 67 is set based on the narrow pulse signal (Rst), that is, the output terminal (Q) is at high level. In addition, since the dimmer signal ("No_dimmer" signal) is a low level signal, the "No_dimmer" signal becomes a high level signal after the low level "No_dimmer" signal is inverted by the inverter 68. Then a logic AND operation is performed on the inverted "No_dimmer" signal and the output terminal (Q) with high level to output a high level, that is, the output control signal (Bleeder_EN) is a high level. Therefore, the bleeder is enabled. On the other hand, the timer 63 receives the narrow pulse signal (Rst) and starts timing based on the clock signal (CLK), the latch 64 latches the timing result (D) output by the timer 63, and the register 65 right shifts the timing result by 1 bit, so that the binary number is divided by two to generate a timing reference (Tref) to the first comparator 66. When the timing result (D) output by the timer 63 is equal to the timing reference (Tref), the RS trigger 67 is reset, and the output terminal (Q) of the RS trigger 67 is at low level. In addition, since the dimmer signal ("No_dimmer" signal) is a low level, the "No_dimmer" signal becomes a high level signal after the low level "No_dimmer" signal is inverted by the inverter 68. Then a logic AND operation is performed on the inverted "No_dimmer" signal and the output terminal (Q) with low level to output a low level, that is, the output control signal (Bleeder_EN) is a low level. Therefore, the bleeder is disabled. In this embodiment, since the register 65 divides the binary number by two, in half of a power frequency cycle, when the sine angle value of the bus voltage signal is between 0 degree and 90 degrees, the bleeder is enabled based on the control signal; and when the sine angle value of the bus voltage signal is between 90 degrees and 180 degrees, the bleeder is disabled based on the control signal.

Please refer to FIG. 17, it is a structural schematic diagram of a bleeder control circuit in another embodiment that the dimmer is a trailing-edge phase dimmer and the dimmer detector is configured to detect existence of the dimmer. As shown in FIG. 17, the bleeder control circuit includes a negative peak detector and a controller. In this embodiment, the first logic circuit in the negative peak detector includes a second comparator 70 and a first inverter 71 and a pulse generator 72. The pulse generator 72 in the negative peak detector outputs a narrow pulse which indicates a negative peak. The controller includes a timer 73, a timing reference generating circuit including a latch 74 and a register 75, a first comparator 76, a reset circuit including a RS trigger 77, and a first logic gate circuit including a second inverter 78, a third inverter 79 and an AND gate 80. In one embodiment, the timer 73 counts continuously and is cleared at each negative peak, and an clock signal (CLK) is generated by an internal oscillator. The latch 74 latches the result of the timer 73 before the timer 73 is cleared at each negative peak, and the output thereof represents the power frequency cycle. The register 75 is a shift register which right shifts the output of the latch 74 by 1 bit, so that the binary number is divided by two, and the output of the register 75 is used as a timing reference. The RS trigger 77 is set at the negative peak, and is reset when the output of the timer 73 is equal to the timing reference. The second inverter 78, the third inverter 79 and the AND gate 80 output a control signal based on the output of the RS trigger 77 and the type of the dimmer, wherein the control signal is output to control the bleeder.

In addition, FIG. 18 shows waveforms of related electric signals in a bleeder control circuit of the present application. In combination with FIG. 17 and FIG. 18, the second comparator 70 receives an electric signal ($V_t$) indicating reference voltage and an electric signal ($V_{BUS}$) indicating bus voltage. In this embodiment, when the electric signal ($V_{BUS}$) is greater than the electric signal ($V_t$), the output compared result (CMPO) is a low level signal; and when the electric signal ($V_{BUS}$) is smaller than the electric signal ($V_t$), the output compared result (CMPO) is a high level signal. The first inverter 71 receives the compared result (CMPO) and performs an inverting operation. When a negative peak is detected, the pulse generator 72 outputs a narrow pulse signal (Rst) based on the electric signal ($V_{BUS}$) and the electric signal ($V_t$) at a falling edge of the compared result (CMPO), which is also at an rising edge of the result output by the first inverter 71. On one hand, the RS trigger 77 is set based on the narrow pulse signal (Rst), that is, the output terminal (Q) is at high level. An inverting operation is performed on the output terminal (Q) with high level to output a low level. In addition, since the dimmer signal ("No_dimmer" signal) is a low level signal, the "No_dimmer" signal becomes a high level signal after the low level "No_dimmer" signal is inverted by the third inverter 79. Then, a logic AND operation is performed on the inverted "No_dimmer" signal and the low level which is output through the inverting operation to output a low level, that is, the output control signal (Bleeder_EN) is a low level. Therefore, the bleeder is disabled. On the other hand, the timer 73 receives the narrow pulse signal (Rst) and starts timing based on the clock signal (CLK), the latch 74 latches the timing result (D) output by the timer 73, and the register 75 right shifts the timing result (D) by 1 bit, so that the binary number is divided by two to generate a timing reference (Tref) to the first comparator 76. When the timing result (D) output by the timer 73 is equal to the timing reference (Tref), the RS trigger 77 is reset, and the output terminal (Q) of the RS trigger 77 is at low level, and an inverting operation is performed on the output terminal (Q) with low level to output a high level. In addition, since the dimmer signal ("No_dimmer" signal) is a low level signal, the "No_dimmer" signal becomes a high level signal after the low level "No_dimmer" signal is inverted by the inverter 79. Then, a logic AND operation is performed on the inverted "No_dimmer" signal and the high level which is output through the inverting operation to output a high level, that is, the output control signal (Bleeder_EN) is a high level. Therefore, the bleeder is enabled. In this embodiment, since the register 75 divides the binary number by two, in half of a power frequency cycle, when the sine angle value of the bus voltage signal is between 0 degree and 90 degrees, the bleeder is disabled based on the control signal; and when the sine angle value of the bus voltage signal is between 90 degrees and 180 degrees, the bleeder is enabled based on the control signal.

It should be noted that, the above register which right shifts the output of the latch by 1 bit, so that the binary number is divided by two is merely exemplary, and also, the phase interval between 0 degree and 90 degrees and the phase interval between 90 degrees and 180 degrees are merely exemplary, and the present application is not limited hereto. Other registers can be used and different phase interval ranges can be divided by those skilled in the art depending on the requirements, which will not be described herein.

In addition, with regard to the case that an analogue signal is used in the timer and the timing reference generator, please refer to FIG. 19, which is a structural schematic diagram of a bleeder control circuit in another embodiment that the dimmer detector is configured to detect existence and a type of the dimmer. As shown in FIG. 19, the bleeder control circuit includes a negative peak detector and a controller. In this embodiment, the first logic circuit in the negative peak detector includes a second comparator 30, a first XOR gate 31, and a first pulse generator 32. The first pulse generator 32 in the negative peak detector outputs a narrow pulse which indicates a negative peak. The controller includes a first inverter 33, a second pulse generator 34, a timer, a timing reference generating circuit, a voltage divider, a first comparator 36, and a first logic gate circuit. In detail, the timer includes a first capacitor circuit comprising a MOSFET (M1) and a capacitor ($C_{timer}$) as shown in the figure; the timing reference generating circuit includes a second capacitor circuit comprising a capacitor ($C_{hold}$) and a switch device (S) as shown in the figure; the voltage divider includes a buffer 35 and resistors (R1) and (R2) as shown in the figure; and the first logic gate circuit includes a second XOR gate 37, a second inverter 38 and an AND gate 39. In one embodiment, timing is performed through charging-discharging of the capacitor ($C_{timer}$), and the timing result of the capacitor ($C_{timer}$) is latched through the capacitor ($C_{hold}$). The latched timing result is divided through the buffer 35 and the resistor (R1) and the resistor (R2) to generate a timing reference and output to the first comparator 36. The second XOR gate 37 and the AND gate 39 output a control signal based on the output of the first comparator 36 and the type of the dimmer, wherein the control signal is output to control the bleeder can be controlled.

In addition, FIG. 20a and FIG. 20b are waveform schematic diagrams of related electric signals in a bleeder control circuit of the present application. FIG. 20a shows waveforms related electric signals when a leading-edge phase dimmer is connected, and FIG. 20b shows waveforms related electric signals when a trailing-edge phase dimmer is connected. In combination with FIG. 19, FIG. 20a and FIG. 20b, the second comparator 30 receives an electric signal ($V_t$) indicating reference voltage and an electric signal ($V_{BUS}$) indicating bus voltage. In this embodiment, when the electric signal ($V_{BUS}$) is greater than electric signal ($V_t$), the output compared result (CMP1O) is a low level signal; and when the electric signal ($V_{BUS}$) is smaller than electric signal ($V_t$), the output compared result (CMP1O) is a high level signal. The first XOR gate 31 receives the compared results (CMP1O) and a detection signal provided by the dimmer detector and then performs XOR logic operation. The detection signal includes a first signal indicating that a leading-edge phase dimmer is existent, a second signal indicating that a trailing-edge phase dimmer is existent, and a third signal indicating non-existence of the dimmer. Specifically, a "Trail" terminal and a "No_dimmer" terminal receive the detection signal. In the following embodiment, the "Trail" terminal with a low level indicates that a leading-edge phase dimmer is existent, the "Trail" terminal with a high level indicates that a trailing-edge phase dimmer is existent, and the "No_dimmer" terminal with a high level indicates non-existence of the dimmer.

As shown in FIG. 20a, when the detection signal is the first signal which indicates that a leading-edge phase dimmer is existent, namely, the "Trail" terminal is at low level, and the "No_dimmer" terminal is at low level. When a negative peak is detected, the first pulse generator 32 outputs a narrow pulse signal (Sample) at an rising edge of the compared result (CMP1O), which is also at an rising edge of the result output by the first XOR gate 31. On one hand, the narrow pulse signal (Sample) enables the switch device (S) to be closed within a short time period, such that the voltage ($V_{ramp}$) across the capacitor ($C_{timer}$) is equal to the voltage ($V_{hold}$) across the capacitor ($C_{hold}$), and the voltage ($V_{hold}$) is latched after the switch device (S) is open. Then, the capacitor ($C_{timer}$) is discharged, and the voltage ($V_{ramp}$) input to the first comparator 36 is smaller than the voltage ($V_{hold}$), that is, the output terminal of the first comparator 36 which outputs a compared result (CMP2O) is at high level. An XOR operation is performed on the output terminal of the first comparator 36 with high level and the "Trail" terminal with low level to output a high level. In addition, since the dimmer signal ("No_dimmer" signal) is a low level signal, the "No_dimmer" signal becomes a high level signal after the low level "No_dimmer" signal is inverted by the second inverter 38. Then, a logical AND operation is performed on the inverted "No_dimmer" signal and the high level which is output through an XOR operation to output a high level, that is, the output control signal (Bleeder_EN) is a high level. Therefore, the bleeder is enabled. On the other hand, another pulse signal (Rst) is output at a falling edge of the narrow pulse signal (Sample) after the narrow pulse signal (Sample) being processed by the first inverter 33 and the second pulse generator 34. The pulse signal (Rst) enables the MOSFET (M1) to be turned on, and the capacitor ($C_{timer}$) begins to be charged and starts timing. The voltage ($V_{ramp}$) across the capacitor ($C_{timer}$) is as shown by oblique waves in the figure. When the next negative peak is detected, namely, after the next narrow pulse signal (Sample) is output, the capacitor ($C_{timer}$) is discharged instantly and reset. Then, the second pulse generator 34 generates the pulse signal (Rst) based on the inverted narrow pulse signal (Sample) which is inverted by the first inverter 33, and the capacitor ($C_{timer}$) restarts timing based on the pulse signal (Rst). In this embodiment, if the resistance value of the resistor (R1) is set to be equal to the resistance value of the resistor (R2), then the voltage ($V_{ref}$) is equal to ($V_{hold/2}$). According to the voltage ($V_{ramp}$) and the voltage ($V_{ref}$) input to the first comparator 36, the output terminal of the first comparator 36 which outputs the compared result (CMP2O) is at high level when the voltage ($V_{ramp}$) is smaller than the voltage ($V_{ref}$). An XOR operation is performed on the output terminal of the first comparator 36 with high level and the "Trail" terminal with low level to output a high level. In addition, since the dimmer signal ("No_dimmer" signal) is a low level signal, the "No_dimmer" signal becomes a high level signal after the low level "No_dimmer" signal is inverted by the second inverter 38. Then a logic AND operation is performed on the inverted "No_dimmer" signal and the high level which is output through the XOR operation to output a high level, that is, the output control signal (Bleeder_EN) is a high level. Therefore, the bleeder is enabled. When the voltage ($V_{ramp}$) is greater than the voltage ($V_{ref}$), the output terminal of the first comparator 36 which outputs the compared result (CMP2O) is at low level. An XOR operation is performed on the output terminal of the first comparator 36 with low level and the "Trail" terminal with low level to output a low level. In addition, since the dimmer signal ("No_dimmer" signal) is a low level signal, the "No_dimmer" signal becomes a high level signal after the low level "No_dimmer" signal is inverted by the second inverter 38. Then, a logic AND operation is performed on the inverted "No_dimmer" signal and the low level which is output through the XOR operation to output a low level, that is, the output control signal (Bleeder_EN) is a low level, thereby the bleeder is disabled. In this embodiment, since the resistance value of the resistor (R1) is set to be equal to resistance value of the resistor (R2), in half of a power frequency cycle, when the sine angle value of the bus voltage signal is between 0 degree and 90 degrees, the bleeder is enabled based on the control signal; and when the sine angle value of the bus voltage signal is between 90 degrees and 180 degrees, the bleeder is disabled based on the control signal.

When the detection signal is the second signal which indicates that a trailing-edge phase dimmer is existent, that is, the "Trail" terminal is at high level and the "No_dimmer" is at low level, the corresponding waveform diagrams are as shown in FIG. 20b, and the corresponding control circuit logic is similar to the above control circuit, and will not be described in detail herein.

When the detection signal is the third signal which indicates non-existence of the dimmer, the "No_dimmer" signal is a high level signal, and the "No_dimmer" signal becomes a low level signal after the high level "No_dimmer" signal is inverted by the second inverter 38. A low level signal can be output when a logic AND operation is performed on the inverted "No_dimmer" signal and the signal in any level, that is, the output control signal (Bleeder_EN) is a low level, thereby the bleeder is disabled. Therefore, when the detection signal indicates non-existence of the dimmer, the bleeder is disabled based on the control signal.

It should be noted that, the above resistances values of the resistor (R1) and the resistor (R2) are merely exemplary, and also, the phase interval between 0 degree and 90 degrees and the phase interval between 90 degrees and 180 degrees are merely exemplary, and the present application is not limited hereto. Different resistance values can be used and different phase interval ranges can be divided by those skilled in the art depending on the requirements, which will not be described herein.

In addition, the implementation manners in which the dimmer is a leading-edge phase dimmer and the dimmer detector is configured to detect existence of the dimmer, as well as the dimmer is a trailing-edge phase dimmer and the dimmer detector is configured to detect existence of the dimmer are similar as the implementation manner mentioned above, and will not be described herein.

It should be noted that, those skilled in the art should understand that the electric signal accessed into a positive input terminal and a negative input terminal of a comparator can be interchanged according to actual design of a circuit, namely, an electric signal ($V_{BUS}$) indicating bus voltage is accessed to a positive input terminal of the comparator, while an electric signal ($V_r$) indicating reference voltage is accessed to a negative input terminal of the comparator, and the corresponding control circuit logics and waveforms of related electric signals will not be described in detail herein. In addition, the above setting of a high level and a low level at the "Trail" terminal are merely exemplary, and the present application is not limited hereto. For example, the "Trail" terminal at a low level indicates that a trailing-edge phase dimmer is existent, and the Trail terminal at a high level indicates that a leading-edge phase dimmer is existent can be set, and these will not be described herein.

Figure 26:
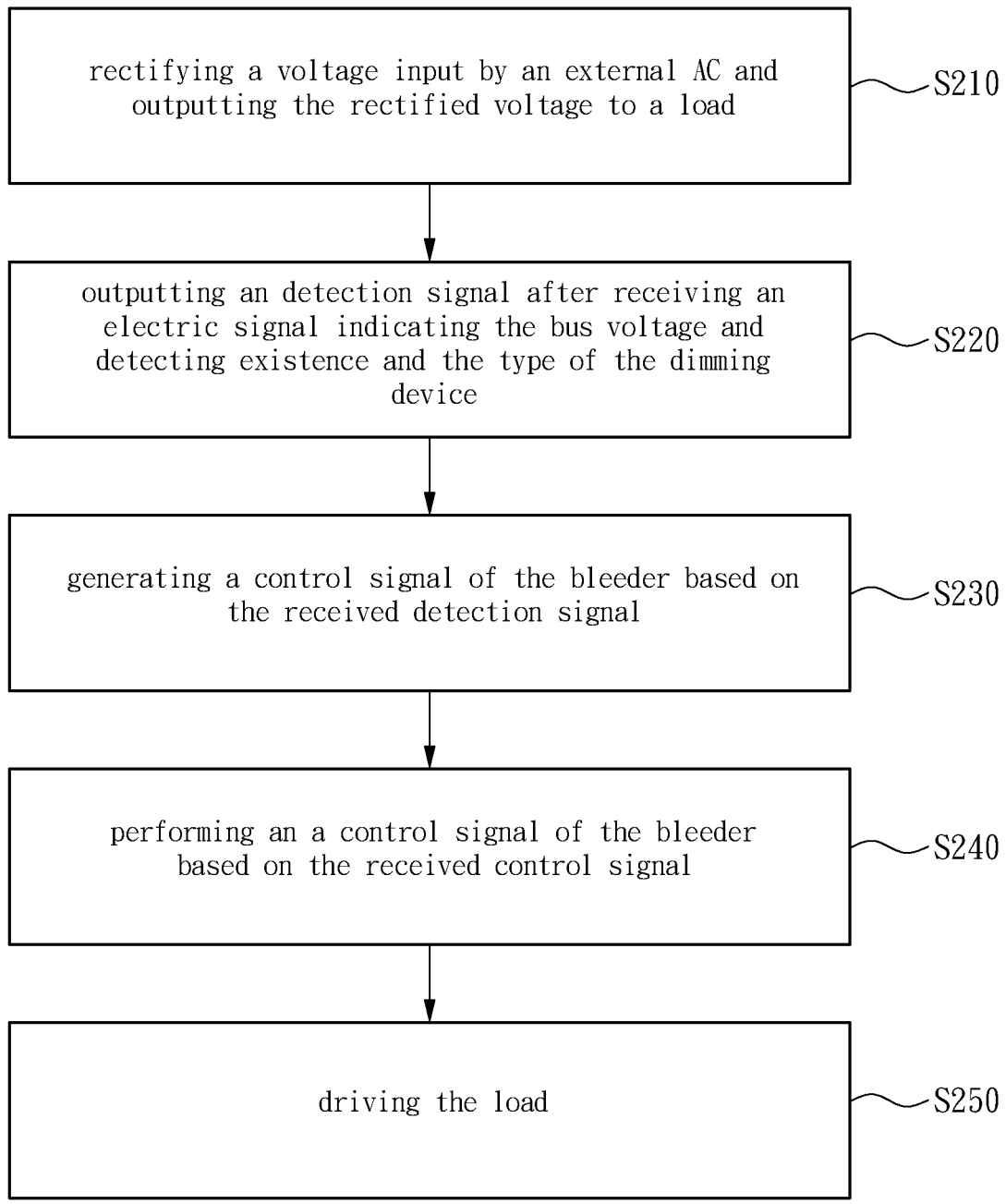
FIG. 26 is a flow chart of a drive method of the present application in one embodiment.

The present application further provides a drive method. The drive method can be performed by the above driver system, or can be performed by other driver systems which can perform the drive method. Please refer to FIG. 26, which is a flow chart of a drive method in one embodiment of the present application. As shown in FIG. 26, the drive method includes step S210, step S220, step S230, step S240 and step S250.

In step S210, a voltage input by an external AC is rectified and the rectified voltage is output to a load.

The present step is performed by a rectifier. For example, the rectifier contains a rectifier bridge which is constituted by four diodes, and the rectifier converts the waveform of the AC into a power supply waveform which takes half of a power frequency cycle as a period.

In step S220, a detection signal is output after receiving an electric signal indicating the bus voltage and detecting existence and the type of the dimming device.

This step is performed by a dimmer detector. The dimmer detector is a circuit provided in the US Patent Publication No. US20190150240A1, which is incorporated by reference herein.

In step S230, a control signal of the bleeder is generated based on the received detection signal, wherein the control signal is a signal based on which an operating state of the bleeder can be controlled.

This step is performed by a control circuit. The ways in which the bleeder control circuit generates a control signal of the bleeder based on the received detection signal is as shown in FIG. 2~20 and related description, and will not be described herein.

In step S240, corresponding operating state of the bleeder is performed based on the received control signal.

This step is performed by a bleeder. The bleeder is a circuit provided in the Chinese Patent Application No. CN103841725B, which is incorporated by reference herein.

In step S250, the load is driven, wherein the load is an LED or a fluorescent lamp.

In the drive method of the present application, the bleeder is controlled to operate within a given phase interval based on a control signal of the bleeder, wherein the control signal is generated based on a detection signal which indicates existence and the type of the dimmer, in this, the power consumption of the bleeder can be reduced while ensuring steady operation of the dimmer or the dimming device.

The preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A bleeder control circuit, coupled to a bleeder and a dimmer detector, wherein the dimmer detector is configured to detect existence and a type of a dimmer to generate a detection signal accordingly, wherein the bleeder control circuit is configured to receive the detection signal and to generate a control signal of the bleeder based on the detection signal, the control signal controls the bleeder, wherein the bleeder control circuit comprises:
    a negative peak detector, configured to receive the detection signal and an electric signal indicating a bus voltage, and accordingly generate a timing signal; and
    a controller, coupled to the negative peak detector and the dimmer detector to receive the timing signal and the detection signal, configured to start timing based on the timing signal, generating a trigger signal when a timing result is equal to a timing reference, and further generating the control signal based on the trigger signal and the detection signal.

2. The bleeder control circuit of claim 1, wherein the negative peak detector comprises:
    a first logic circuit, coupled to the dimmer detector and configured to generate an executive signal based on the electric signal and the detection signal; and
    a pulse generator, coupled to the first logic circuit and configured to output the timing signal based on the executive signal generated by the first logic circuit.

3. The bleeder control circuit of claim 1, wherein the controller comprises:
    a timer, coupled to the negative peak detector and configured to receive the timing signal and start timing based on a clock signal;
    a timing reference generator, coupled to the negative peak detector and the timer, and configured to generate a timing reference;
    a first comparator, coupled to the timer and the timing reference generator, and configured to generate a reset signal when the timing result is equal to the timing reference;
    a reset circuit, coupled to the first comparator and the negative peak detector, and configured to generate the trigger signal based on the timing signal and the reset signal; and
    a first logic gate circuit, coupled to the reset circuit and the dimmer detector, and configured to output the control signal based on the detection signal and the trigger signal.

4. The bleeder control circuit of claim 3, wherein the timing result is in a form of binary digitals, and wherein the timing reference generator comprises:
    a latch, coupled to the timer and configured to latch the timing result generated by the timer; and
    a register, coupled to the latch and configured to shift bits of the latched timing result to generate the timing reference.

5. The bleeder control circuit of claim 3, wherein the timing result is in a form of a voltage level, and wherein the timer comprises:
    a first capacitor circuit, configured to record time through charging and discharging of a first capacitor and generate the timing result accordingly.

6. The bleeder control circuit of claim 5, wherein the timing reference generator comprises:
    a second capacitor circuit, coupled to the first capacitor circuit and configured to latch the timing result from the first capacitor circuit; and
    a voltage divider, coupled to the second capacitor circuit and configured to divide the latched timing result to generate the timing reference.

7. The bleeder control circuit of claim 1, wherein the controller comprises:
    a timer, coupled to the negative peak detector and configured to receive the timing signal and to start timing based on a clock signal;
    a first comparator, a first terminal of the first comparator coupled to the timer and a second terminal of the first comparator receiving the timing reference, and configured to generate a reset signal when the timing result is equal to the timing reference;
    a reset circuit, coupled to the first comparator and the negative peak detector, and configured to generate the trigger signal based on the timing signal and the reset signal; and
    a first logic gate circuit, coupled to the reset circuit and the dimmer detector, and configured to output the control signal based on the detection signal and the trigger signal.

8. The bleeder control circuit of claim 1, wherein
    if the detection signal indicates that the dimmer is a leading edge dimmer, the bleeder control circuit generates the control signal to enable the bleeder when a sine angle value of a bus voltage signal is between 0 degree and a first degree, and the bleeder control circuit generates the control signal to disable the bleeder when the sine angle value of the bus voltage signal is between the first degree and 180 degrees; and
    if the detection signal indicates that the dimmer is a trailing-edge dimmer, the bleeder control circuit generates the control signal to disable the bleeder when the sine angle value of the bus voltage signal is between 0 degree and a second degree, and the bleeder control circuit generates the control signal to enable the bleeder when the sine angle value of the bus voltage signal is between the second degree and 180 degrees; and wherein if the detection signal indicates non-existence of the dimmer, the bleeder control circuit generates the control signal to disable the bleeder.

9. A driver system, comprising:
a rectifier, configured to rectify an AC input voltage to output a bus voltage to a load;
a dimmer detector, configured to receive an electric signal indicating the bus voltage, and to generate a detection signal to detect existence and a type of a dimmer;
a bleeder control circuit, coupled to the dimmer detector, the dimmer detector being configured to detect existence and a type of a dimmer to generate a detection signal accordingly, wherein the bleeder control circuit is configured to receive a detection signal generated by the dimmer detector and to generate a control signal based on the detection signal, control signal controls the bleeder; and
a bleeder, coupled to the bleeder control circuit, and configured to perform corresponding operating state when the control signal generated by the bleeder control circuit is received,
wherein the bleeder control circuit comprises:
a negative peak detector, configured to receive the detection signal and an electric signal indicating a bus voltage, and accordingly generate a timing signal; and
a controller, coupled to the negative peak detector and the dimmer detector to receive the timing signal and the detection signal, configured to start timing based on the timing signal, generating a trigger signal when a timing result is equal to a timing reference, and further generating the control signal based on the trigger signal and the detection signal.

10. A method for controlling a bleeder, comprising the following steps:
receiving a detection signal indicating existence and a type of a dimmer; and
generating a control signal to control the bleeder based on the detection signal,
wherein the step of generating the control signal based on the detection signal comprises:
receiving the detection signal and an electric signal indicating a bus voltage, and accordingly generating a timing signal; and
starting timing based on the timing signal, generating a trigger signal when a timing result is equal to a timing reference, and outputting the control signal based on the trigger signal and the detection signal.

11. The method for controlling a bleeder of claim 10, wherein the step of generating a timing signal comprises:
outputting an executive signal based on the detection signal and an electric signal indicating a bus voltage; and
outputting the timing signal based on the executive signal.

12. The method for controlling a bleeder of claim 11, wherein the step of starting timing is performed through charging and discharging of a capacitor in a first capacitor circuit.

13. The method for controlling a bleeder of claim 11, wherein a timing result is in the form of binary digitals, and the timing reference is generated through shifting bits of the timing result.

14. The method for controlling a bleeder of claim 11, wherein a timing result is in the form of voltage signal, and the timing reference is generated through dividing the timing result.

15. The method for controlling a bleeder of claim 10, wherein the method comprises:
if the detection signal indicates that the dimmer is a leading-edge dimmer, enabling the bleeder when the sine angle value of a bus voltage signal is between 0 degree and a first degree, and disabling the bleeder when the sine angle value of a bus voltage signal is between the first degree and 180 degrees;
wherein if the detection signal indicates that the dimmer is a trailing-edge dimmer, disabling the bleeder when the sine angle value of a bus voltage signal is between 0 degree and a second degree, and enabling the bleeder when the sine angle value of a bus voltage signal is between the second degree and 180 degrees; and
wherein if the detection signal indicates that non-existence of the dimmer, disabling the bleeder.

* * * * *